United States Patent
Nelson et al.

(10) Patent No.: US 12,293,527 B2
(45) Date of Patent: May 6, 2025

(54) POWDER FLOW MEASUREMENT IN ADDITIVE MANUFACTURING SYSTEMS

(71) Applicant: Rolls-Royce Corporation, Indianapolis, IN (US)

(72) Inventors: Scott Nelson, Indianapolis, IN (US); Baily Thomas, Rogersville, MO (US); Abdalla R. Nassar, State College, PA (US); Jason Scherer, State College, PA (US); John Grubbs, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 290 days.

(21) Appl. No.: 17/932,962

(22) Filed: Sep. 16, 2022

(65) Prior Publication Data
US 2023/0092671 A1 Mar. 23, 2023

Related U.S. Application Data

(60) Provisional application No. 63/247,528, filed on Sep. 23, 2021.

(51) Int. Cl.
*G06T 7/20* (2017.01)
*B22F 10/80* (2021.01)
(Continued)

(52) U.S. Cl.
CPC .............. *G06T 7/20* (2013.01); *B22F 10/80* (2021.01); *B22F 12/90* (2021.01); *B33Y 50/00* (2014.12); *G06T 7/62* (2017.01); *G06T 7/70* (2017.01); *G06T 11/00* (2013.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 5,396,333 A | * | 3/1995 | Aleshin | G01N 15/0205 356/601 |
| 11,198,640 B2 | * | 12/2021 | Kelley | B24C 1/04 |

(Continued)

FOREIGN PATENT DOCUMENTS

| | | |
|---|---|---|
| CN | 108956609 A | 12/2018 |
| DE | 102011009345 B3 | 8/2012 |
| JP | 2021521008 A | 8/2021 |

OTHER PUBLICATIONS

Mann Stefan et al: "New sensor and system technology for higher process ctability in LMD", SPIE Proceedings, Proceedings vol. 10911, High-Power Laser Materials Processing: Applications, Diagnostics, and Systems VIII; 109110I (2019) https://doi.org/10.1117/12.2506776 (Year: 2019).*

(Continued)

*Primary Examiner* — Tahmina N Ansari
(74) *Attorney, Agent, or Firm* — Shumaker & Sieffert, P.A.

(57) ABSTRACT

A powder flow monitoring system may include a computing device configured to receive image data representing illuminated powder of a powder stream between a powder delivery device and a build surface of a component, generate a representation of the powder stream based on the image data, and output the representation of the powder stream for display at a display device.

20 Claims, 11 Drawing Sheets

(51) Int. Cl.
| | |
|---|---|
| *B22F 12/90* | (2021.01) |
| *B33Y 50/00* | (2015.01) |
| *G06T 7/62* | (2017.01) |
| *G06T 7/70* | (2017.01) |
| *G06T 11/00* | (2006.01) |

(56) References Cited

U.S. PATENT DOCUMENTS

| | | | |
|---|---|---|---|
| 11,890,675 B2 | 2/2024 | Riede et al. | |
| 2012/0243797 A1* | 9/2012 | Di Venuto Dayer | H04N 23/56 382/218 |
| 2015/0283610 A1* | 10/2015 | Ljungblad | B29C 64/386 419/55 |
| 2019/0268507 A1* | 8/2019 | Nakamura | H04N 23/80 |
| 2021/0046708 A1* | 2/2021 | Riede | B22F 10/25 |
| 2023/0089809 A1* | 3/2023 | Nelson | B22F 10/25 219/121.64 |
| 2023/0090298 A1* | 3/2023 | Nelson | G05B 19/4099 700/118 |
| 2023/0091046 A1* | 3/2023 | Nelson | B22F 12/90 700/119 |
| 2023/0092671 A1* | 3/2023 | Nelson | G01N 15/0227 382/103 |
| 2023/0278108 A1* | 9/2023 | Fleury | B22F 10/28 266/78 |
| 2024/0416589 A1* | 12/2024 | Ruiz-Vargas | B22F 10/31 |

OTHER PUBLICATIONS

U.S. Appl. No. 17/932,945, filed Sep. 16, 2022, naming inventors Nelson et al.

U.S. Appl. No. 17/932,959, filed Sep. 16, 2022, naming inventors Nelson et al.

Balu et al., "Parametric study on a coaxial multi-material powder flow in laser-based powder deposition process", Journal of Materials Processing Technology, vol. 212, No. 7, Feb. 2012, pp. 1598-1610.

Extended Search Report from counterpart European Application No. 22196861.3 dated Jan. 26, 2023, 13 pp.

Garcia-Moreno et al., "A new PIV method to measure powder flow velocity in laser metal deposition: an Eulerian-based approach", The International Journal of Advanced Manufacturing Technology, vol. 117, No. 5-6, Aug. 2021, pp. 1825-1841.

Mann et al., "New sensor and system technology for higher process stability in LMD", Proceedings vol. 10911, High-Power Laser Materials Proceeding: Applications, Diagnostics, and Systems VIII, vol. 10911, Feb. 2019, 8 pp.

Riede, "Formnext 2019: Fraunhofer IWS presents COAXshield and LIsec AM systems", Optics.org, Nov. 2019, 3 pp., Retrieved from the Internet on Jan. 18, 2023 from URL: https://optics.org/news/10/11/29.

Riede, "LIsec: Systems Integrated Powder Nozzle Measuring System for Additive Manufacturing Applications", Fraunhofer, Nov. 2019, 2 pp., Retrieved from the Internet on Jan. 18, 2023 from URL: https://www.iws.fraunhofer.de/content/dam/iws/en/documents/publications/product_sheets/600-10_pulverduesenmessystem_en.pdf.

Tan et al., "Dynamic evolution of powder stream convergence with powder feeding durations in direct energy deposition", International Journal of Machine Tools and Manufacture, vol. 157, Oct. 2020, 16 pp.

Response to Extended Search Report dated Jan. 26, 2023, from counterpart European Application No. 22196861.3 filed Sep. 27, 2023, 75 pp.

Brown et al., "Insights into Powder Flow Characterization Methods for Directed Energy Distribution Additive Manufacturing Systems," Solid Freeform Fabrication 2018: Proceedings of the 29th Annual International Solid Freeform Symposium—an Additive Manufacturing Conference, Aug. 2018, 13 pp.

Melo, "Powder jet particle density distribution analysis and qualification for the laser metal deposition process," Dissertation Universidade Federal de Santa Catarina, retrieved from https://repositorio.ufsc.br/xmlui/handle/123456789/171441, Florianopolis, Dec. 2016, 134 pp.

Sdvizhenskii et al., "Online laser-induced breakdown spectroscopy for metal-particle powder flow analysis during additive manufacturing," Journal of Analytical Atompic Spectrometry, Issue 2, No. 25, Royal Society of Chemistry, Dec. 2, 2019, pp. 246-253.

Communication pursuant to Article 94(3) EPC from counterpart European Application No. 22196861.3 dated Dec. 18, 2024, 30 pp.

Montero et al., "Inspection of Powder Flow During LMD Deposition by High Speed Imaging", Physics Procedia, vol. 83, Elsevier, Sep. 16, 2016, pp. 1319-1328.

Office Action from U.S. Appl. No. 17/932,959 dated Dec. 18, 2024, 14 pp.

Response to Office Action dated Dec. 18, 2024 from U.S. Appl. No. 17/932,959, filed Mar. 14, 2025, 7 pp.

\* cited by examiner

POWDER FLOW MEASUREMENT IN ADDITIVE MANUFACTURING SYSTEMS

This application claims the benefit of U.S. Provisional Patent Application No. 63/247,528, filed 23 Sep. 2021, the entire contents of which is incorporated herein by reference.

TECHNICAL FIELD

The disclosure relates to additive manufacturing techniques.

BACKGROUND

Additive manufacturing generates three-dimensional structures through addition of material layer-by-layer or volume-by-volume to form the structure, rather than removing material from an existing component to generate the three-dimensional structure. Additive manufacturing may be advantageous in many situations, such as rapid prototyping, forming components with complex three-dimensional structures, or the like. In some examples, additive manufacturing may utilize powdered materials and may melt or sinter the powdered material together in predetermined shapes to form the three-dimensional structures.

SUMMARY

In some examples, the disclosure describes an additive manufacturing system that includes a powder delivery device configured to direct a powder stream toward a build surface of a component, and a powder flow monitoring system. The powder delivery device defines a longitudinal axis oriented toward the build surface. The powder flow monitoring system includes an illumination device configured to illuminate at least some powder the powder stream between the powder delivery device and the build surface; and an imaging device configured to image the illuminated powder at an image plane that intersects the longitudinal axis. The illumination device and the imaging device may be registered to the powder delivery device in a plane substantially orthogonal to the longitudinal axis.

In some examples, the disclosure describes a method that includes directing, by a powder delivery device, powder stream toward a build surface of a component, wherein the powder delivery device defines a longitudinal axis oriented toward the build surface. The method also includes illuminating, by an illumination device of a powder flow monitoring system, at least some powder of the powder stream between the powder delivery device and the build surface. The method further may include imaging, by an imaging device of the powder flow monitoring system, the illuminated powder at an image plane that intersects the longitudinal axis, wherein the illumination device and the imaging device are registered to the powder delivery device in a plane substantially orthogonal to the longitudinal axis.

In some examples, the disclosure describes a powder flow monitoring system that includes a computing device configured to receive image data representing illuminated powder of a powder stream between a powder delivery device and a build surface of a component, generate a representation of the powder stream based on the image data, and output the representation of the powder stream for display at a display device.

In some examples, the disclosure describes a method that includes receiving, by a computing device, image data representing illuminated powder of a powder stream between a powder delivery device and a build surface of a component; generating, by the computing device, a representation of the powder stream based on the imaged powder; and outputting, by the computing device, the representation of the powder stream for display at a display device.

In some examples, the disclosure describes a system that includes one or more computing devices configured to receive image data representing illuminated powder of a powder stream between a powder delivery device of an additive manufacturing system and a build surface of a component; determine at least one metric associated with the powder stream based on the received image data; determine whether the at least one metric indicates an abnormal state of the at least one metric; and cause the additive manufacturing system to perform at least one action in response to determining that the at least one metric indicates the abnormal state.

In some examples, the disclosure describes a method that includes receiving, by one or more computing devices, image data representing illuminated powder of a powder stream between a powder delivery device of an additive manufacturing system and a build surface of a component; determining, by the one or more computing devices, at least one metric associated with the powder stream based on the received image data; determining, by the one or more computing devices, whether the at least one metric indicates an abnormal state of the at least one metric; and causing, by the one or more computing devices, the additive manufacturing system to perform at least one action in response to determining that the at least one metric indicates the abnormal state.

The details of one or more examples are set forth in the accompanying drawings and the description below. Other features, objects, and advantages will be apparent from the description and drawings, and from the claims.

DETAILED DESCRIPTION

Figure 1:
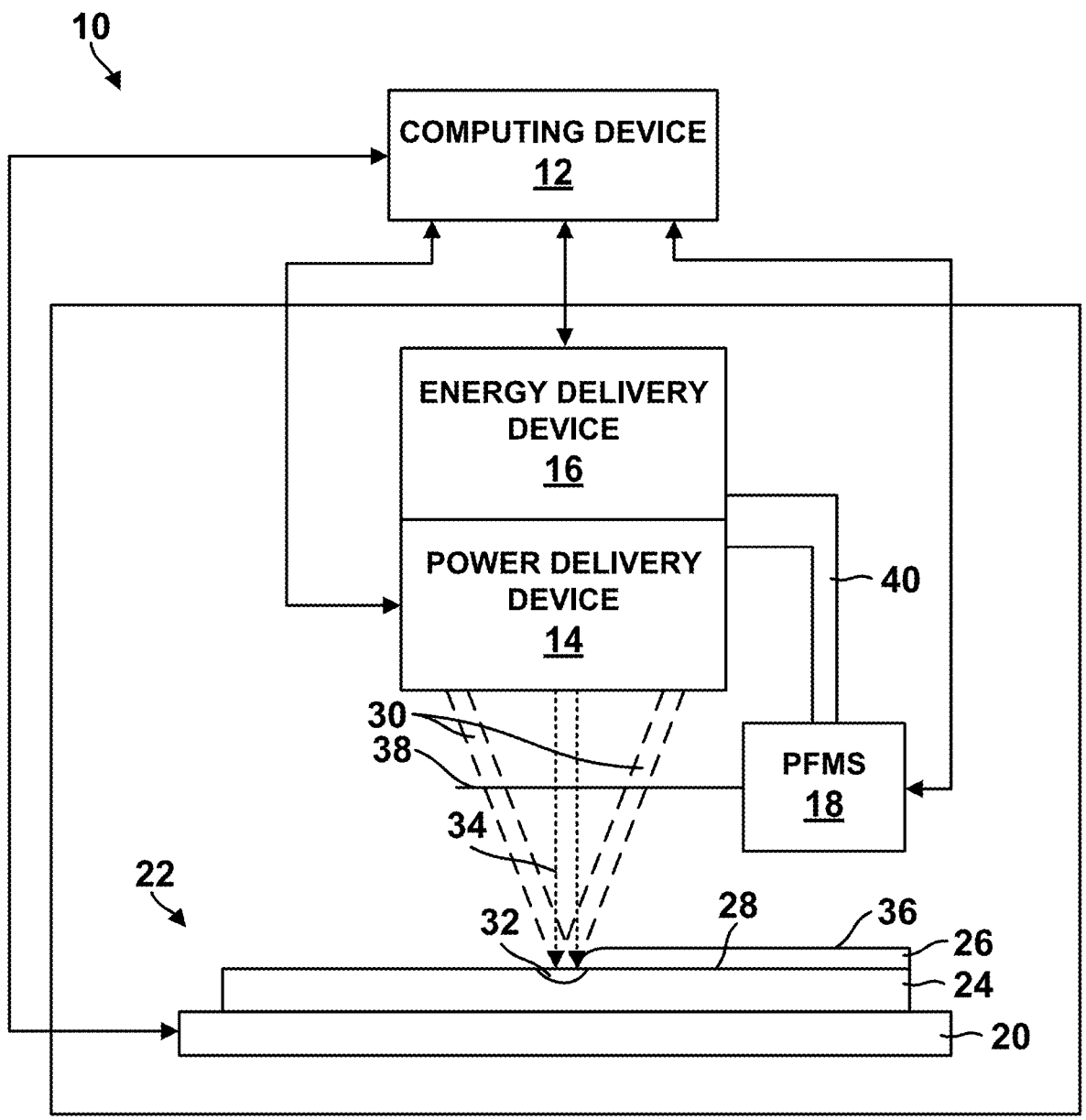
FIG. 1 is a conceptual block diagram illustrating an example additive manufacturing system that includes a powder flow monitoring system configured to monitor powder flow between a powder delivery device and a build surface during the additive manufacturing technique.

The disclosure generally describes techniques and systems for measuring powder flow between a powder delivery device and a build surface during a blown powder additive manufacturing technique, such as directed energy deposition. Example powder flow monitoring systems (PFMS) may include an optical system that includes an illumination device and an imaging device. The illumination device and imaging device may work together to image at least a portion of powder flow between a powder delivery device and a build surface. A computing device may analyze the image to determine a number of powder detections in each image, and may convert the number of powder detections to powder mass flow or powder mass flow rate, e.g., using a calibration curve. The computing device may be configured to output a representation of the powder flow in any one or more of a variety of formats. For example, the computing device may be configured to output a number representing the detections or mass flow (e.g., a numerical mass flow rate in, for example, milligrams per minute or other appropriate units), a graphical representations of detections per unit time or mass flow per unit time, a graphical representation of detections or mass flow as a function of position (e.g., axial position and/or position within the image plane), or the like.

Additionally, or alternatively, the computing device may be configured to determine one or more powder delivery system characteristics based on the images. For instance, based on the powder flow distribution, the computing device may be configured to identify a damaged powder delivery device nozzle, a clog within a powder delivery device nozzle, or the like.

In some implementations, the computing device may be configured to control the blown powder additive manufacturing technique based on the image data. For instance, upon detecting a clog, the computing device may be configured to cause the powder delivery device to be cleaned, e.g., using a temporary high flow rate of gas though the powder delivery device, through mechanical cleaning of the powder delivery device, or the like. As another example, the computing device may be configured to compare a measured parameter, such as a measured particle detections, a measured mass flow rate, a measured detection or mass flow distribution, or the like to a setpoint or set range. Upon determining that the measured parameter deviates from the setpoint or set range, the computing device may control one or more process variables (e.g., mass flow of powder from a powder source, process gas flow rate, or the like) and re-measure the measured parameter until computing device determines that the measured parameter satisfies the setpoint or the set range.

During blown powder additive manufacturing, a component is built up by adding material to the component in sequential layers. The final component is composed of a plurality of layers of material. In some blown powder additive manufacturing techniques for forming components from metals or alloys, an energy source may direct energy at a substrate to form a melt pool. A powder delivery device may deliver a powder to the melt pool, where at least some of the powder at least partially melts and is joined to the melt pool and, thus, substrate.

The resulting layers and final component thus are dependent upon how powder is captured by the melt pool. For instance, both the fraction of powder captured by the melt pool and the shape of the powder stream at the melt pool (e.g., the focus of the powder stream at the melt pool) affect capture of the powder by the melt pool. Because of the heat generated by the energy source a melt pool, and the high velocity of the powder within the powder stream, monitoring powder flow between the powder delivery device and the build surface in which the melt pool is located may be difficult.

In accordance with techniques of this disclosure, a PFMS may include an illumination device, such as a laser, and an imaging device. The laser is configured to illuminate a plane of the powder stream, e.g., a plane substantially perpendicular to an axis extending between the powder delivery device and the build surface. The imaging device is configured to image the illuminated powder. The imaging device may have a relatively high data acquisition speed (e.g., frame rate), such greater than 1000 Hz. Because of the velocity of the powder in the powder stream, even such a frame rate may image only a fraction of the powder flowing between the powder delivery device and the build surface.

In some examples, the PFMS also includes a housing configured to enclose the illumination device and the imaging device. The housing may be configured to protect the illumination device and the imaging device from damage due to the harsh conditions to which the PFMS will be exposed during use. For example, the housing may protect the illumination device and the imaging device from powder deflections, may cool the illumination device and the imaging device to remove heat from the melt pool and energy source, or the like.

By including a PFMS as described herein and/or using the analysis techniques described herein, understanding and/or control of the powder stream in a blown powder additive manufacturing technique may be improved. This may facilitate development of blown powder additive manufacturing techniques for desired components, allow more precise control of a blown powder additive manufacturing technique, or the like.

FIG. 1 is a conceptual block diagram illustrating an example system 10 for performing an additive manufacturing technique, such as a blown powder additive manufacturing technique. System 10 includes a powder flow monitoring system (PFMS) 18 for powder flow between powder delivery device 14 and build surface 28 during the blown powder additive manufacturing technique. In the example illustrated in FIG. 1, system 10 includes a computing device 12, powder delivery device 14, an energy delivery device 16, PFMS 18, and a stage 20. Computing device 12 is operably connected to powder delivery device 14, energy delivery device 16, PFMS 18, and stage 20.

In some examples, stage 20 is movable relative to energy delivery device 16 and/or energy delivery device 16 is movable relative to stage 20. Similarly, stage 20 may be movable relative to powder delivery device 14 and/or powder delivery device 14 may be movable relative to stage 20. For example, stage 20 may be translatable and/or rotatable along at least one axis to position component 22 relative to energy delivery device 16 and/or powder delivery device 14. Similarly, energy delivery device 16 and/or powder delivery device 14 may be translatable and/or rotatable along at least one axis to position energy delivery device 16 and/or powder delivery device 14, respectively, relative to component 22. Stage 20 may be configured to selectively position and restrain component 22 in place relative to stage 20 during manufacturing of component 22.

Powder delivery device 14 may be configured to deliver powder to selected locations of component 22 being formed via a powder stream 30. Powder delivery device 14 may include one or more nozzles that each output powder. The combined powder defines powder stream 30. In some examples, powder delivery device 14 includes a single nozzle, which may be point nozzle, or a single nozzle that is an annular channel. In other examples, powder delivery device 14 includes a plurality of nozzles (e.g., three nozzles or four nozzles). Regardless of the number of nozzles, powder delivery device 14 may output a powder stream that is focused at a focus plane. As powder delivery device 14 is movable in the z-axis shown in FIG. 1 relative to component 22, the focal plane of powder delivery device 14 also may be movable in the z-axis relative to component 22, such that the focus plane may be controlled to be substantially coincident with build surface 28.

At least some of the powder in powder stream 30 may impact a melt pool 32 in component 22. At least some of the powder that impacts melt pool 32 may be joined to component 22. In some examples, the powder may be supplied by powder delivery device 14 in powder form, e.g., a powder entrained in a carrier gas flow. In some examples, powder delivery device 14 thus may be fluidically coupled to a powder source and a gas source. In some examples, powder delivery device 14 may be mechanically coupled or attached to energy delivery device 16 to facilitate delivery of powder stream 30 and energy 34 for forming melt pool 32 to substantially the same location adjacent to component 22.

Energy delivery device 16 may include an energy source, such as a laser source, an electron beam source, plasma source, or another source of energy that may be absorbed by component 22 to form a melt pool 32 and/or be absorbed by powder in powder stream 30 to be added to component 22. Example laser sources include a CO laser, a $CO_2$ laser, a Nd:YAG laser, or the like. In some examples, the energy source may be selected to provide energy with a predetermined wavelength or wavelength spectrum that may be absorbed by component 22 and/or the powder to be added to component 22 during the additive manufacturing technique.

In some examples, energy delivery device 16 also includes an energy delivery head, which is operatively connected to the energy source. The energy delivery head may aim, focus, or direct energy 34 toward predetermined positions at or adjacent to a surface of component 22 during the additive manufacturing technique. As described above, in some examples, the energy delivery head may be movable in at least one dimension (e.g., translatable and/or rotatable) under control of computing device 12 to direct the energy toward a selected location at or adjacent to a surface of component 22.

In some examples, at least a portion of energy delivery device 16 and powder delivery device 14 may be combined or attached to each other. For example, a deposition head (e.g., deposition head 54 of FIG. 2) may include part of powder delivery device 14 (e.g., internal channels and powder nozzle(s) 56 for forming powder stream 30 and directing powder stream 30 toward build surface 28) and part of energy delivery device 16 (e.g., the energy deliver head). As shown in FIG. 1, in some examples, energy delivery device 16 may be arranged of configured such that energy 34 and powder stream 30 both exit from a common deposition head and are directed toward build surface 28. For instance, energy 34 may pass through a central channel within the deposition head and exit a central aperture in the deposition head, while fluidized powder may flow through internal channels and powder nozzle(s) 56 for forming powder stream 30 and directing powder stream 30 toward build surface 28.

Computing device 12 is configured to control components of system 10 and may include, for example, a desktop computer, a laptop computer, a workstation, a server, a mainframe, a cloud computing system, or the like. Computing device 12 is configured to control operation of system 10, including, for example, powder delivery device 14, energy delivery device 16, optical system 18, and/or stage 20. Computing device 12 may be communicatively coupled to powder delivery device 14, energy delivery device 16, optical system 18, and/or stage 20 using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

Although FIG. 1 illustrates a single computing device 12 and attributes all control and processing functions to that single computing device 12, in other examples, system 10 may include multiple computing devices 12, e.g., a plurality of computing devices 12. In general, control and processing functions described herein may be divided among one or more computing devices. For instance, system 10 may include controller for energy delivery device 16, powder delivery device 14, and stage 20, a separate controller for PFMS 18, and a separate computing device for analyzing data obtained by PFMS 18. As another example, system may include a dedicated controller for each of energy delivery device 16, powder delivery device 14, stage 20, and PFMS 18, and a separate computing device for coordinating control of energy delivery device 16, powder delivery device 14, stage 20, and/or PFMS 18 and analyzing data obtained by PFMS 18. Other examples of computing system architectures for controlling system 10 and analyzing data obtained from system 10 will be apparent and are within the scope of this disclosure.

Computing device 12 may be configured to control operation of powder delivery device 14, energy delivery device 16, optical system 18, and/or stage 20 to position component 22 relative to powder delivery device 14, energy delivery device 16, optical system 18, and/or stage 20. For example, as described above, computing device 12 may control stage 20 and powder delivery device 14, energy delivery device 16, and/or one or more components of optical system 18 to translate and/or rotate along at least one axis to position component 22 relative to powder delivery device 14, energy delivery device 16, and/or optical system 18. Positioning component 22 relative to powder delivery device 14, energy delivery device 16, and/or optical system 18 may include positioning a predetermined surface (e.g., a surface to which material is to be added) of component 22 in a predetermined orientation relative to powder delivery device 14, energy delivery device 16, and/or optical system 18.

Computing device 12 may be configured to control system 10 to deposit layers 24 and 26 to form component 22. As shown in FIG. 1, component 22 may include a first layer 24 and a second layer 26, although many components may be formed of additional layers, such as tens of layers, hundreds of layers, thousands of layers, or the like. Component 22 in FIG. 1 is simplified in geometry and the number of layers compared to many components formed using additive manufacturing techniques. Although techniques are described herein with respect to component 22 including first layer 24 and second layer 26, the technique may be extended to components 22 with more complex geometry and any number of layers.

To form component 22, computing device 12 may control powder delivery device 14 and energy delivery device 16 to form, on a surface 28 of first layer of material 24, a second layer of material 26 using an additive manufacturing technique. Computing device 12 may control energy delivery device 16 to deliver energy 34 to a volume at or near surface 28 to form melt pool 32. For example, computing device 12 may control the relative position of energy delivery device 16 and stage 20 to direct energy to the volume. Computing device 12 also may control powder delivery device 14 to deliver powder stream 30 to melt pool 32. For example, computing device 12 may control the relative position of powder delivery device 14 and stage 20 to direct powder stream 30 at or on to melt pool 32. Computing device 12 may control powder delivery device 14 and energy delivery device 16 to move energy 34 and powder stream 30 along build surface 28 in a pattern until layer 26 is complete. Computing device 12 then may control a z-axis position of stage 20 and/or powder delivery device 14 and energy delivery device 16 such that melt pool 32 will be formed on surface 36 of second layer 26, and may control powder delivery device 14 and energy delivery device 16 to move energy 34 and powder stream 30 along build surface 28 in a pattern until layer 26 is complete. Computing device 12 may control powder delivery device 14 and energy delivery device 16 similarly until all layers are formed to define a completed component 22.

In accordance with techniques of this disclosure, system 10 includes a powder flow monitoring system (PFMS) 18. PFMS 18 is configured to image at least a portion of powder stream 30 to detect powder flowing between powder delivery device 14 and build surface 28. For example, PFMS 18 may include an illumination device and an imaging device. In some examples, the illumination device may include one or more light source. For instance, the illumination device may include one or more structured light devices, such as one or more lasers. The illumination device is configured to illuminate a plane of powder stream 30 at image plane 38, e.g., a plane substantially perpendicular to an axis extending between powder delivery device 14 and build surface 28.

The imaging device of PFMS 18 is configured to image at least some of the illuminated powder. The imaging device may have a relatively high data acquisition speed (e.g., frame rate), such greater than 1000 Hz. Because of the velocity of the powder in powder stream 30, even such a frame rate may image only a fraction of the powder flowing between powder delivery device 14 and build surface 28.

In some examples, PFMS 18 also includes a housing configured to enclose the illumination device and the imaging device. The housing may be configured to protect the illumination device and the imaging device from damage due to the harsh conditions to which PFMS 18 may be exposed during use. For example, the housing may protect the illumination device and the imaging device from powder deflections from powder stream 30 off build surface 28, may cool the illumination device and the imaging device to remove heat incident on PFMS 18 from melt pool 32 and energy delivery device 16, or the like.

PFMS 18 may be positionally fixed relative to powder delivery device 14 and/or energy delivery device 16, e.g., in the x-y plane shown in FIG. 1. This may help maintain a relative x-y position of PFMS 18 and the image plane of the imaging device relative to powder stream 30. This may facilitate analysis of image data captured by the imaging device.

PFMS 18 may be movable in the z-axis direction of FIG. 1 (e.g., parallel to a longitudinal axis extending from powder delivery device 14 to build surface 28). This may enable movement of image plane 38 along the z-axis of FIG. 1 (e.g., parallel to a longitudinal axis extending from powder delivery device 14 to build surface 28). This may allow PFMS 18 to image powder stream 30 at different positions between powder delivery device 14 and build surface 28. In this way, PFMS 18 may analyze powder stream 30 along powder stream 30 to help determine parameters of powder stream 30 along its length.

In some example, PFMS 18 may be positionally fixed relative to powder delivery device 14 and/or energy delivery device 16 and movable parallel to a longitudinal axis extending from powder delivery device 14 to build surface 28 by an adjustable z-stage 40. Adjustable z-stage 40 may be attached to energy delivery device 16, powder delivery device 14, or a portion of system 10 that moves energy delivery device 16 and/or powder delivery device 14, such that PFMS 18 moves in the x-y axis in registration with energy delivery device 16 and/or powder delivery device 14.

Adjustable z-stage 40 may be controlled by computing device 12 to position PFMS 18 and image plane 38 relative to powder stream 30. Further, computing device 12 may control adjustable z-stage 40 to move PFMS 18 vertically and out of the way to allow powder delivery device 16 and energy delivery device 16 access to physically constrained areas, e.g., between vanes of a doublet or triplet of a nozzle guide vane for a gas turbine engine.

Figure 2:
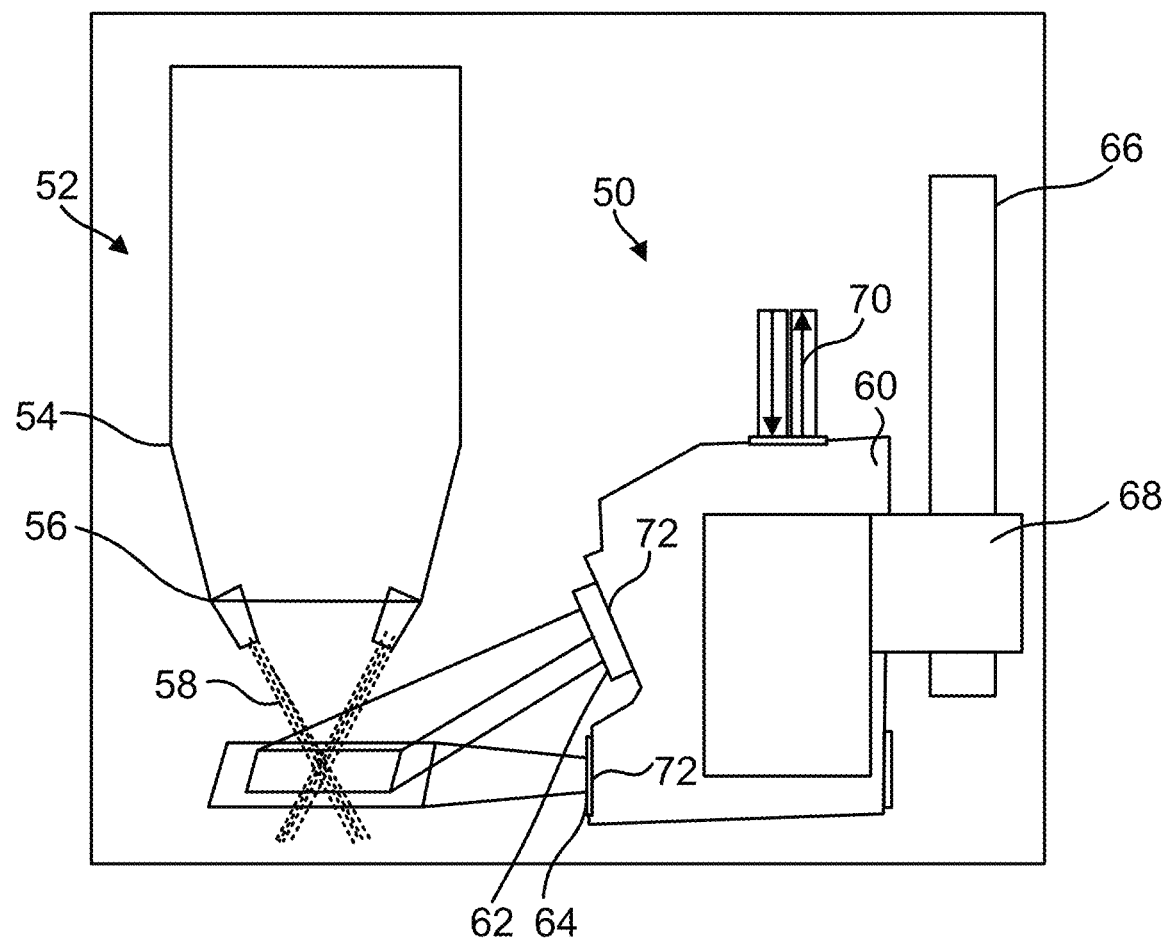
FIG. 2 is a conceptual and schematic diagram illustrating an example powder flow monitoring system configured to monitor powder flow between a powder delivery device and a build surface during the additive manufacturing technique.

FIG. 2 is a conceptual and schematic diagram illustrating an example powder flow monitoring system 50 configured to monitor powder flow between a powder delivery device 52 and a build surface (not shown in FIG. 2) during an additive manufacturing technique. Powder delivery device 52 may be an example of powder delivery device 14 of FIG. 1, and PFMS may be an example of PFMS 18 of FIG. 1.

Powder delivery device 52 includes a deposition head 54 that carries a plurality of powder nozzles 56. Plurality of powder nozzles 56 output a powder stream 58 toward the build surface. As shown in FIG. 2, the powder stream 58 may be focused at a focal plane, such that powder stream 58 is converging toward the focal plane and diverging away from the focal plane.

PFMS 18 includes a housing 60 (also referred to as an enclosure), which encloses an imaging device 62 and an illumination device 64. In some examples, imaging device 62 may be a high-speed camera and illumination device 64 may be laser illuminator. Housing 60 is attached to an adjustable z-stage 66 by a bracket 68.

Housing 60 is configured to enclose imaging device 62 and illumination device 64 and help protect imaging device 62 and illumination device 64 from a surrounding environment. For instance, housing 60 may be configured to surround imaging device 62 and illumination device 64 and prevent any powder that reflects from the build surface toward PFMS 18 from impacting imaging device 62 or illumination device 64.

Further, housing 60 may be configured to cool imaging device 62 and illumination device 64. Imaging device 62 and illumination device 64 may be exposed to heat from the melt pool at the build surface and energy from the energy delivery device. Imaging device 62 and illumination device 64 may be relatively sensitive to heat and have improved operational lifetime if maintained and operated below a certain temperature. PFMS 50 may include a cooling system 70 configured to remove heat from within housing 60 to cooling imaging device 62 and illumination device 64. For instance, cooling system 70 may include cooling fluid circuit through which a cooling fluid flows, and housing 60 may include part of the cooling circuit. In some examples, housing 60 may be formed from a material having relatively high thermal conductivity, such as aluminum, to help transfer heat from within housing 60 to cooling system 70 (e.g., a cooling fluid flowing through cooling system 70).

In some examples, housing 60 may be configured to position, orient, and allow light to pass through to or from imaging device 62 and illumination device 64, respectively. For example, housing 60 may include one or more apertures or view ports through which light can pass. In some examples, the apertures or view ports may be filled with a material 72 that is substantially transparent to wavelengths of interest, e.g., wavelengths of illumination device 64. Additionally, or alternatively, the apertures or view ports may be filled with a material 72 that is not substantially transparent to at least some other wavelengths, e.g., wavelengths associated with energy 34 (FIG. 1) or emitted by melt pool 32 (FIG. 1). In this way the material 72 that fills the apertures or view ports may, in some examples, act as a filter to attenuate or remove wavelengths associated with energy 34 (FIG. 1) and/or emitted by melt pool 32 (FIG. 1) while passing wavelengths associated with PFMS 50.

Figure 3:
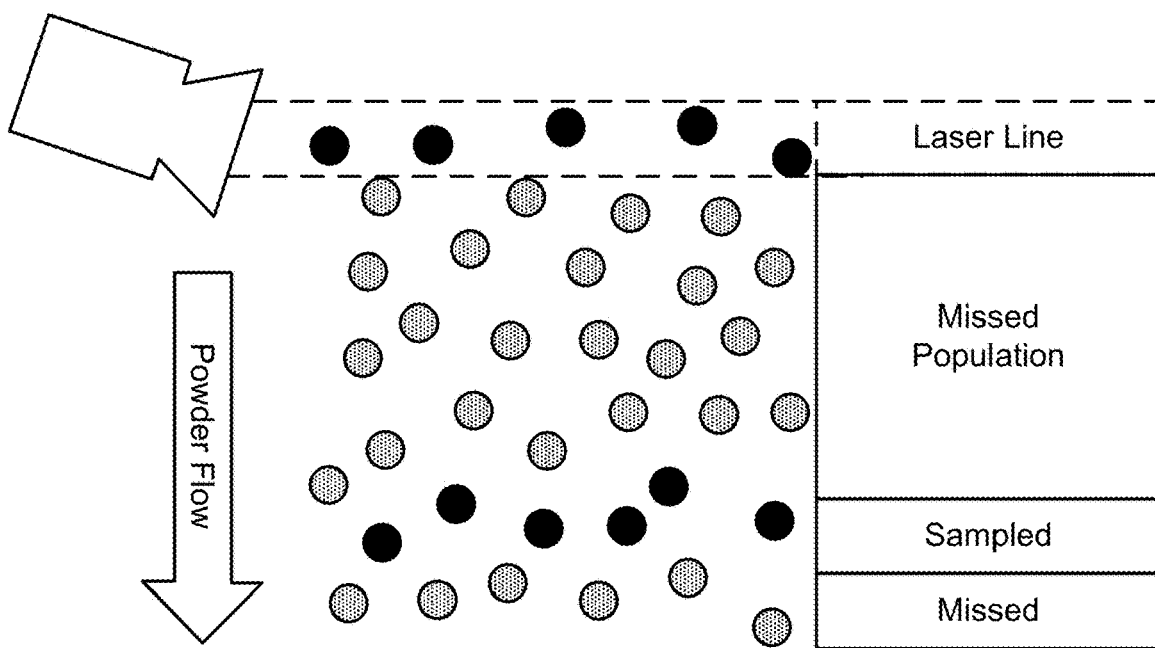
FIG. 3 is a conceptual diagram illustrating an example of portions of a powder stream imaged by a powder flow monitoring system.

As described above, PFMS 50 may be configured to measure powder flow of powder stream 58 (FIG. 2) at one or more axial (or longitudinal) locations of powder stream 58 and determine one or more parameters associated with the powder flow. For instance, illumination device 64 may illuminate powder of powder stream 58 in a plane oriented substantially orthogonal to a longitudinal axis that extends from powder delivery device 52 to the build surface. PFMS 50 may be positioned at a selected axial or longitudinal location to image a selected axial or longitudinal position between powder delivery device 52 and the build surface. Imaging device 62 may be configured to image at least some of the illuminated powder. FIG. 3 is a conceptual diagram illustrating an example of portions of a powder stream imaged by a powder flow monitoring system.

As shown in FIG. 3, since powder is flowing in powder stream 58 at a relatively high velocity, imaging device 62 may not capture images of all the powder in powder stream 58. The fraction of powder that imaging device 62 captures images of may be a function of average powder velocity at the image plane and a frame rate or capture speed of imaging device 62. This is represented in FIG. 3 as "sampled" particles and "missed population" particles. The fraction of particles imaged by imaging device 62 may, in some examples, be less than about 50%, less than about 40%, less than about 30%, less than about 25%, less than about 20%, or less than about 15%.

PFMS 50 may include a computing device (e.g., computing device 12 of FIG. 1) configured to analyze images captured by imaging device 62 to identify a number of particle detections in each captured image and, optionally, derive further parameters from the number of particle detections. As such, computing device 12 may be configured to receive image data representing an image captured by imaging device 62. The image data may include representations of illuminated powder of powder stream 58, as imaged by imaging device 62 (e.g., as captured in an image frame by imaging device 62). Computing device 12 may be configured to generate a representation of powder stream based on the image data and output the representation of the powder stream for display at a display device.

For instance, computing device 12 may be configured determine a powder mass flow represented by the image data. To do so, computing device 12 may be configured to identify a number of powder particles within each image frame. In some examples, computing device 12 additionally may be configured to identify a size and/or shape of each powder particle within each image frame. Computing device 12 may be configured to implement any suitable image analysis technique to identify powder particles, and, optionally, size and/or shape of powder particles.

Figure 4:
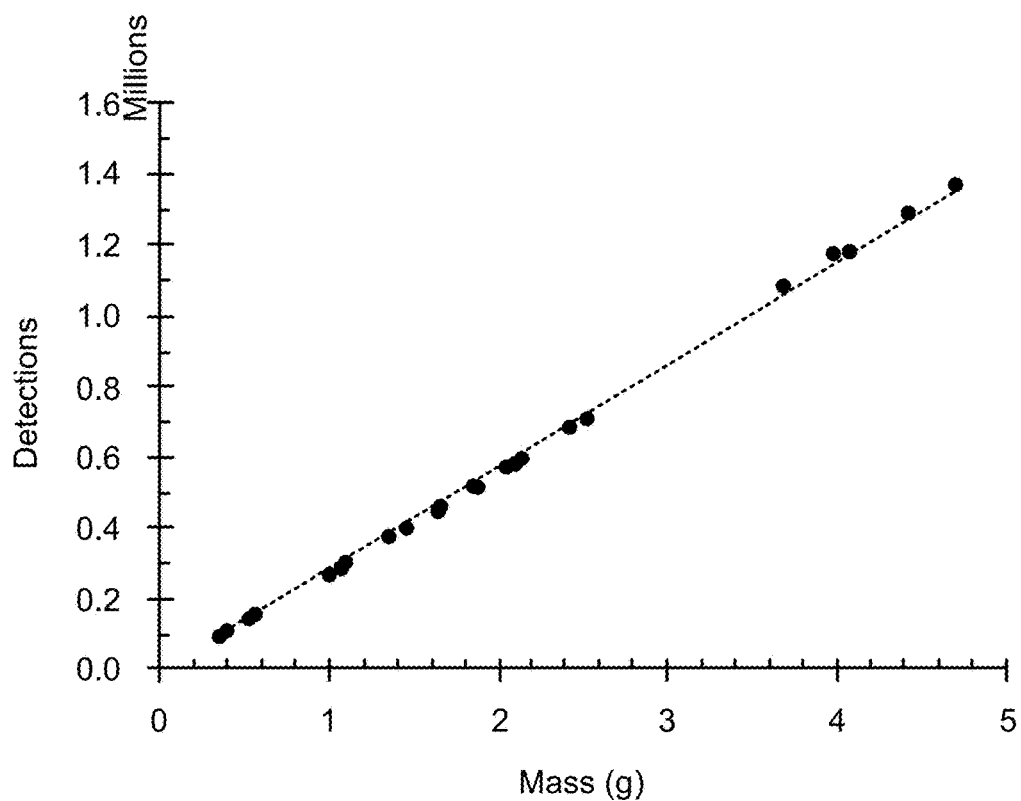
FIG. 4 is an example calibration curve of particle detections versus mass flow.

Once computing device 12 has identified a number of powder particles within an image frame, computing device 12 may be configured to determine a mass flow based on the number of powder particles. For example, computing device 12 may be configured to determine the mass flow based on a calibration equation or calibration curve. FIG. 4 is an example calibration curve of particle detections versus mass flow. As shown in FIG. 4, the relationship between particle detections may be substantially linear.

The relationship between particle detections and mass flow may be determined experimentally. For instance, the relationship between particle detections and mass flow may be determined for each powder type (e.g., composition, size distribution, or both), as each powder type may have a different relationship between particle detections and mass flow. The relationship may be determined experimentally by flowing a known mass of powder at a known rate, and imaging the powder. By doing this multiple times at multiple rates, the calibration curve may be generated. The curve, in the form of an equation, a look-up table, or the like, may be stored in computing device 12, and computing device 12 may use the calibration curve to determine mass flow of a similar type of powder at a different flow rate based on particle detections.

In some examples, computing device 12 may receive image data representative of a sequence of images of illuminated powder in powder stream 58. Each image may be associated with a time. As such, computing device 12 may select one or more images of the sequence of images and analyze the one or more images. For each selected image, computing device 12 may be configured to identify a number of particle detections and, optionally, determine a mass flow associated with powder stream 58 for each image frame.

Computing device 12 may be configured to generate a representation of the powder stream based on the image data. The representation may be a number, such as a number of detections, a detection rate, a mass flow, a mass flow rate, or the like. Alternatively, or additionally, the representation may be a user interface screen that graphically represents the powder stream.

Figure 5:
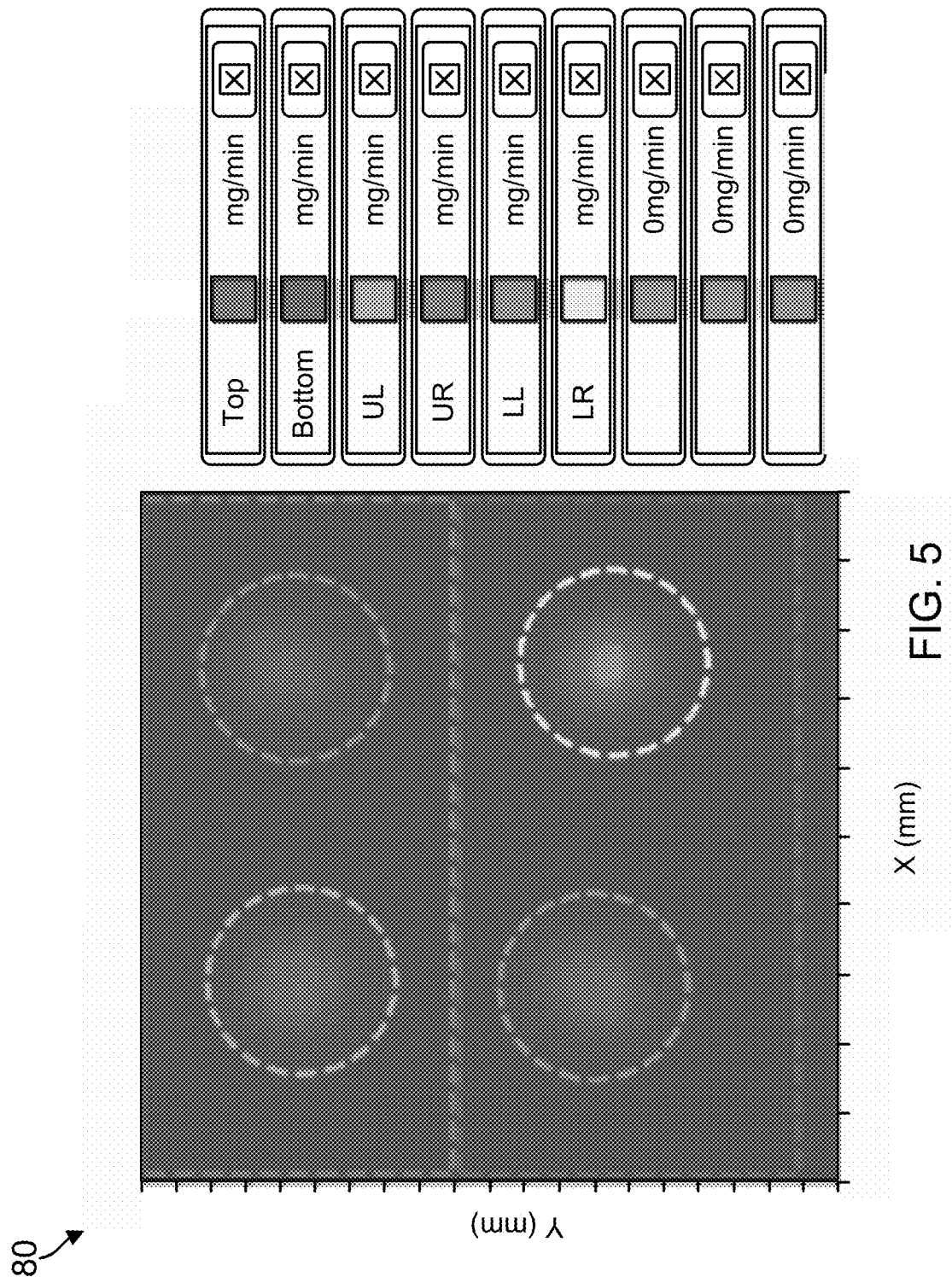
FIG. 5 is an example graphical user interface screen illustrating heat maps of mass flow for each of four regions of interest.

FIG. 5 is an example graphical user interface screen 80 illustrating heat maps 82, 84, 86, and 88 of mass flow for each of four regions of interest. In the example shown in FIG. 5, a first heat map 82 represents a mass flow rate (measured in mg/min) for a first region of interest, which includes an upper left portion of a powder stream (e.g., nearer to the powder delivery device than the build surface and associated with a left nozzle of a plurality of nozzles). Second heat map 84 represents a mass flow rate (measured in mg/min) for a second region of interest, which includes an upper right portion of a powder stream (e.g., nearer to the powder delivery device 52 than the build surface and associated with a right nozzle of a plurality of nozzles). To collect image data from which computing device 12 may determine third heat map 86 and fourth heat map 88, PFMS 50 may be positioned at a first, upper position along the longitudinal axis that extends between powder delivery device 52 and the build surface. Computing device 12 may then select a first subset of the image data from an image frame as representative of the left portion of the powder stream, e.g., based on identifying a cluster of powder detections, and may select a second subset of the image data from an image frame as representative of the right portion of the powder stream, e.g., based on identifying a cluster of powder detections.

Graphical user interface screen 80 also includes a third heat map 86 and a fourth heat map 88. Third heat map 86 represents a mass flow rate (measured in mg/min) for a third region of interest, which includes a lower left portion of a powder stream (e.g., nearer to the build surface than the powder delivery device 52 and associated with a left nozzle of a plurality of nozzles). Fourth heat map 88 represents a mass flow rate (measured in mg/min) for a fourth region of interest, which includes a lower right portion of a powder stream (e.g., nearer to the build surface that powder delivery device 52 and associated with a right nozzle of a plurality of nozzles). To collect image data from which computing device 12 may determine first heat map 82 and second heat map 84, PFMS 50 may be positioned at a second, lower position along the longitudinal axis that extends between powder delivery device 52 and the build surface. Computing device 12 may then select a first subset of the image data from an image frame as representative of the left portion of the powder stream, e.g., based on identifying a cluster of powder detections, and may select a second subset of the image data from an image frame as representative of the right portion of the powder stream, e.g., based on identifying a cluster of powder detections.

Although graphical user interface screen 80 includes four regions of interest and corresponding mass flow rates, computing device 12 analyze any selected number of regions of interest, e.g., one region of interest, two regions of interest, three regions of interest, or more regions of interest. In general computing device 12 or a user of computing device 12 may cause computing device 12 to separate powder stream 58 into any number of regions of interest, and analyze image data associated with the regions of interest. Further, although FIG. 5 illustrates mass flow rate, in other examples, graphical user interface screen 80 may include a detection rate, in addition to or instead of the mass flow rate.

In some examples, computing device 12 may determine each heat map of heat maps 82, 84, 86, and 88 based on a single image frame (e.g., a first common image frame for heat maps 82 and 84 and a second common image frame for heat maps 86 and 88, or a single, different image frame for each of heat maps 82, 84, 86, and 88). Computing device 12 may use information regarding the number of powder detections, the relationship between powder detections and mass flow, and a known velocity of the powder to determine the mass flow rate. In other examples, computing device 12 may aggregate or integrate powder detections or mass from a plurality of image frames to generate heat maps 82, 84, 86, and 88.

Figure 6:
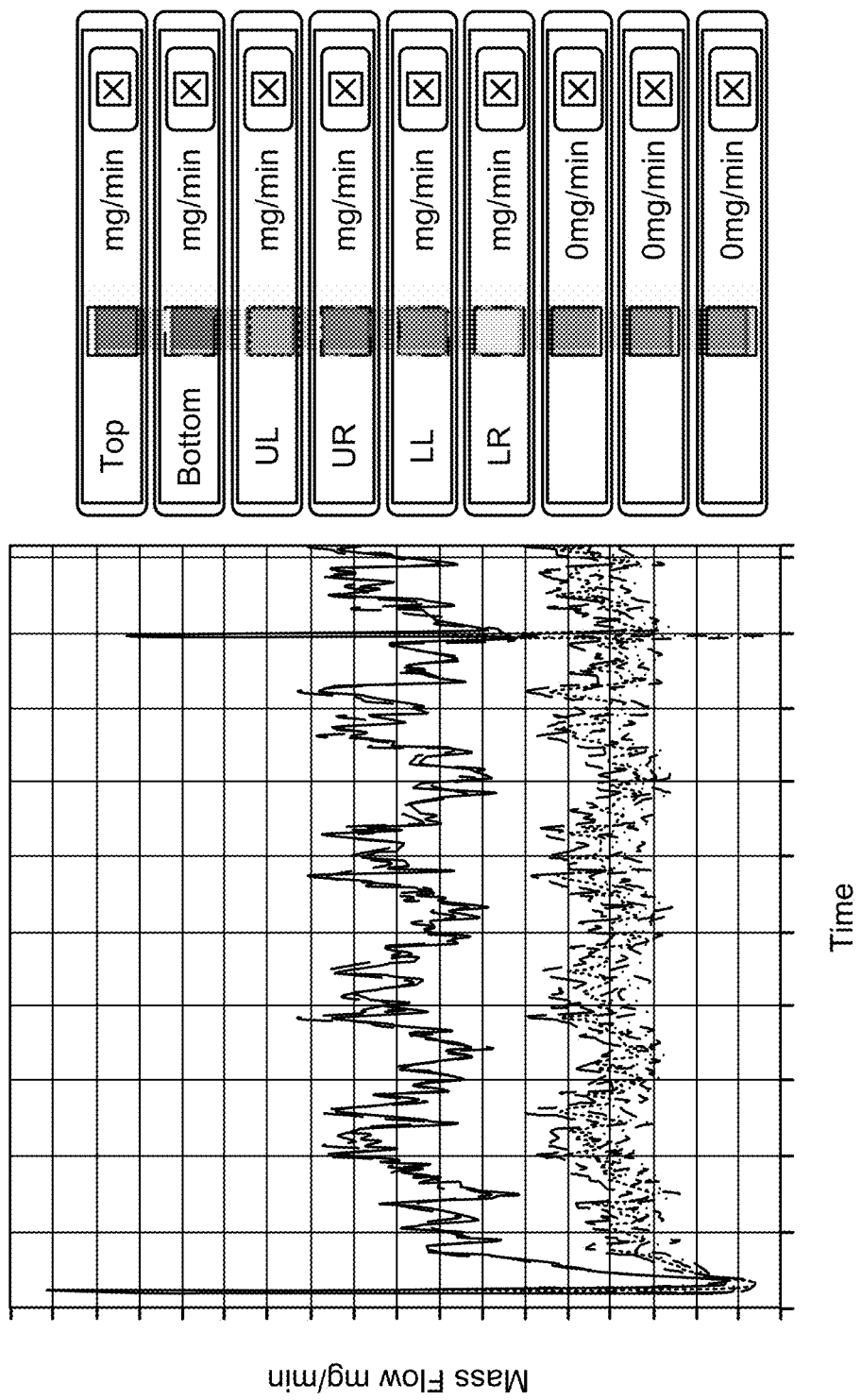
FIG. 6 is an example graphical user interface screen illustrating mass flow versus time for each of six regions of interest.

FIG. 6 is another example graphical user interface screen 90 illustrating a second type of graphical representation of instantaneous mass flow versus time for each of six regions of interest. In FIG. 6, the regions of interest may include a top region, a bottom region, an upper left region, an upper right region, a lower left region, and a lower right region. The top region is a sum of the upper left and upper right regions, and the bottom region is a sum of the lower left and lower right regions. Like the example shown in FIG. 5, to collect the image data for the top regions, upper left region, and upper right region, PFMS 50 may be positioned to image a first image plane, nearer to powder delivery device 52 than the build surface. To collect the image data for the bottom region, upper left region, and upper right region, PFMS 50 may be positioned to image a second image plane, nearer to the build surface than to powder delivery device 52.

To compute an instantaneous mass flow, computing device 12 may be configured to analyze a single image frame to produce each instantaneous mass flow, rather than combining multiple image frames to produce an instantaneous mass flow. For instance, computing device 12 may receive a first image frame associated with the first, upper image plane and analyze the first image frame to determine a data point for the top mass flow plot, the upper left mass flow plot, and the upper right mass flow plot. Computing device 12 then may receive a second image frame, captured at a later time than the first image frame, and analyze the second image frame to determine a data point for the top mass flow plot, the upper left mass flow plot, and the upper right mass flow plot. Computing device 12 may repeat this analysis of individual image frames to produce data points over time for the top mass flow plot, the upper left mass flow plot, and the upper right mass flow plot. Computing device 12 may perform a similar analysis of image frames associated with the second, lower image plane to determine data points for the bottom mass flow plot, the lower left mass flow plot, and the lower right mass flow plot.

The plots of mass flow versus time shown in FIG. 6 may help an operator or computing device 12 determine a flow consistency for each region of interest. This may help the user or computing device 12 identify flow pulsing, which may be indicative of wear or damage to a portion of the system, such as a powder nozzle, channel within powder delivery device 52, a valve, or the like.

Figure 7A:
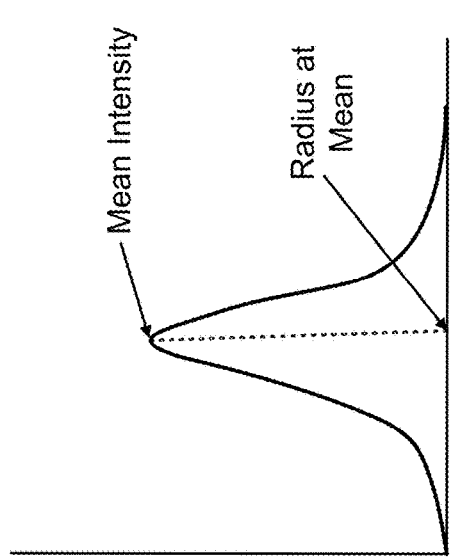
FIG. 7A is an example plot of particle detections as a function of radius and angle for a region of interest.
Figure 7B:
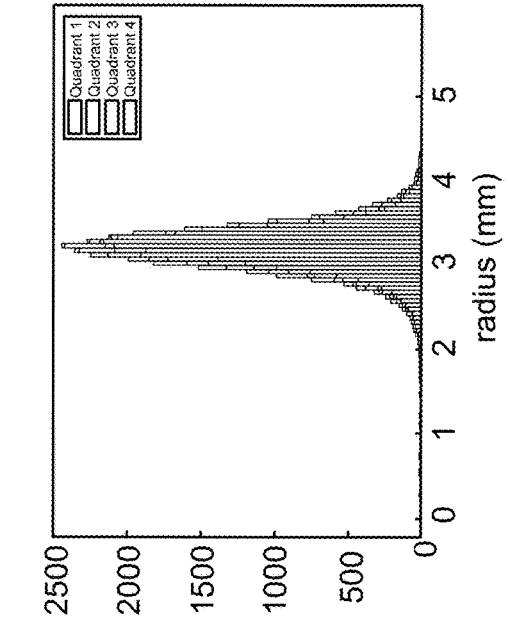
FIG. 7B is an example plot of particle detections as a function of radius along a radius of FIG. 7A.

In some examples, computing device 12 may be configured to generate and output a representation of a geometrical distribution of powder within powder stream 58. For example, FIG. 7A is an example plot of particle detections as a function of radius and angle for a region of interest. FIG. 7B is an example plot of particle detections as a function of radius along a radius of FIG. 7A. Computing device 12 may be configured to receive image data representing illuminated powder of powder stream 58 between powder delivery device 50 and a build surface of a component, with PFMS 50 positioned at a selected location along the longitudinal axis extending between powder delivery device 50 and the build surface. Computing device 12 then may analyze the image data (including a single image frame or a sequence of image frames) to determine a geometric distribution of powder within powder stream 58.

For instance, computing device 12 may be configured to determine corresponding locations of particle detections according to a selected coordinate system. For instance, computing device 12 may be configured to determine corresponding locations of particle detections according to a polar coordinate system, a cartesian coordinate system, or the like.

Computing device 12 may be configured to determine a powder distribution for a region of interest based on the corresponding locations of particle detections. For instance, computing device 12 may be configured to select a radius (in a polar coordinate system) and determine a powder distribution along the radius. As another example, computing device 12 may be configured to select a sector of the polar coordinate system (e.g., a quadrant or a smaller or larger sector) and determine a radial powder distribution within the sector.

FIG. 7A illustrates an example of a portion of a powder distribution within a polar coordinate system. As shown in FIG. 7A, in some examples, at some axial locations of a powder stream, the powder stream may be annular. For instance, the powder stream may be conical above the focal plane, with an annular distribution of powder in the plane orthogonal to an axis of the cone. As such, powder distribution may be concentrated around a radial distance in a powder distribution curve. In some examples, the powder distribution curve may be substantially similar to a bell curve or gaussian curve. FIG. 7B illustrates an example plot of a powder distribution curve along the radius shown in FIG. 7A. As shown in FIG. 7B, the powder distribution curve may be characterized by a mean intensity (which may be proportional to a number of particle distributions as a function of radius), and a radius at the mean intensity. Additionally, although not shown in FIG. 7B, computing device 12 also may determine other statistical properties of the powder distribution, such as a standard deviation of the powder distribution curve, or the like.

In other examples, such as at different axial positions of powder stream 58, the powder distribution may be different, e.g., may not be annular. For instance, at or near the focal plane of powder stream 58, the powder distribution may be approximately circular with a gaussian distribution of powder. As another example, where powder delivery device 52 includes multiple discrete powder nozzles 56, the powder distribution at locations near the powder delivery device 52 may be concentrated in multiple flows corresponding to the number and position of the discrete powder nozzles 56.

Figure 8A:
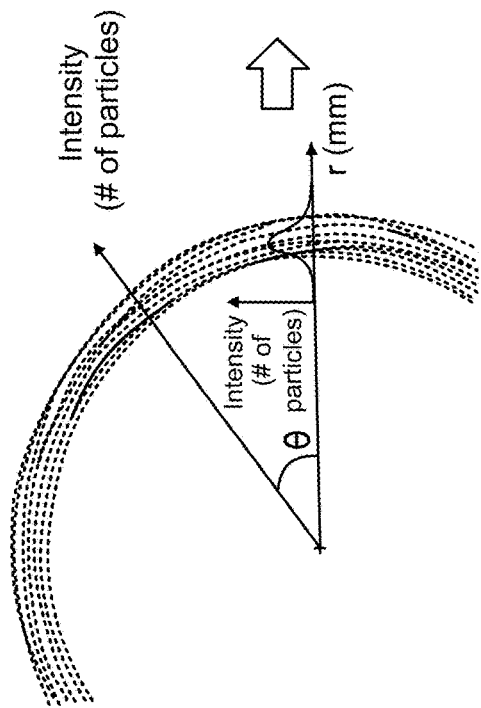
FIG. 8A is an example plot of particle detections in an image plane plotted in polar coordinates.
Figure 8B:
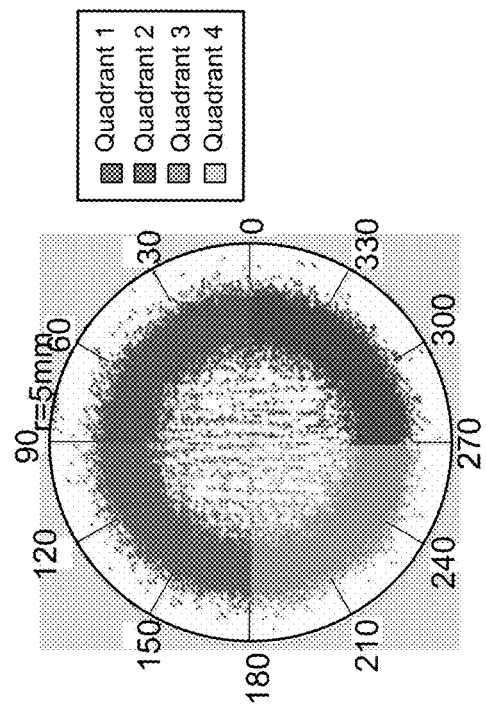
FIG. 8B is an example plot of number of powder detections versus radial distance for each of the four quadrants shown in FIG. 9A.

In some examples, rather than determining the powder distribution curve along a single radius, computing device 12 may determine powder distribution curve for a sector of a the polar coordinate system. For instance, FIG. 8A is an example plot of powder distribution in an image plane plotted in polar coordinates. As shown in FIG. 8A, the image plane and polar coordinate system has been divided into four substantially equal segments, e.g., into quadrants. Each quadrant subtends an angle of about 90 degrees. FIG. 8B is an example plot of number of powder detections versus radial distance for each of the four quadrants shown in FIG. 8A. Computing device 12 may be configured to generate the plot shown in FIG. 8B by associated each powder detection with a coordinate (e.g., radius and angle) and binning particle detections into bins associated with a subtended angle (e.g., quadrant) and range of radius values.

In some examples, computing device 12 may generate a representation of the powder stream from image data associated with different positions of PFMS 50 along the axis of powder stream 58. This may enable a three-dimensional representation of powder stream 58 and powder distribution (and mass flow) within powder stream 58 at three-dimensional locations of powder stream 58. For instance, computing device 12 may control PFMS 50 to be positioned at a selected axial position of powder stream 58 and to collect at least one image (e.g., an image or a sequence of images) at the selected axial position. Computing device 12 may control PFMS 50 to be positioned at a second selected axial position of powder stream 58 and to collect at least one image (e.g., an image or a sequence of images) at the second selected axial position. Computing device 12 may repeat this for any selected number of axial positions.

Figure 9A:
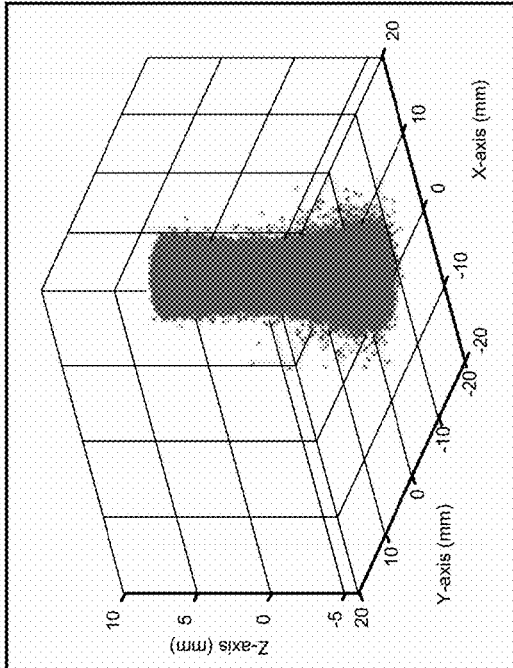
FIG. 9A is an example plot of particle detections in an image plane plotted in polar coordinates for each of two gas flow rates.

Computing device 12 then may analyze the at least one image frame at each axial position to determine coordinates for powder detections at each axial position, e.g., in a polar coordinate or cartesian coordinate system. For example, FIG. 9A is an example plot of powder detections in an image plane (at a selected axial position of powder stream 58) plotted in cartesian coordinates.

Figure 9B:
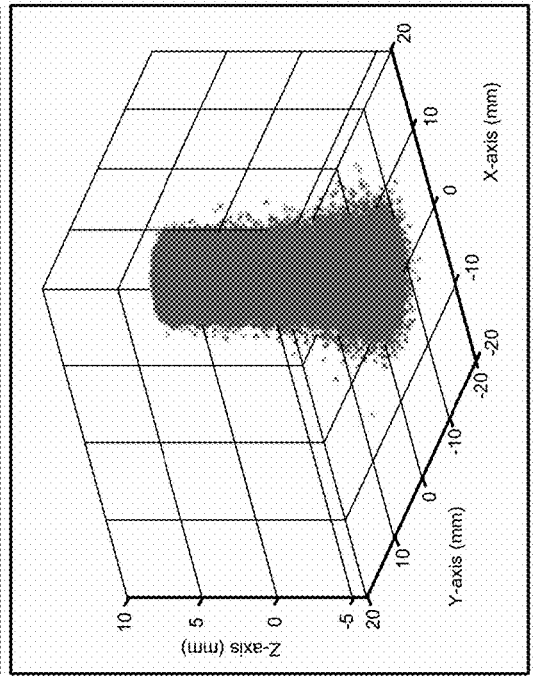
FIG. 9B is an example three-dimensional plot of particle detections plotted in cartesian coordinates.

Computing device 12 also may associate each axial position with an axial coordinate, e.g., within a cylindrical or cartesian coordinate system. This may allow computing device 12 to assemble powder detections from different axial locations to generate a three-dimensional representation of powder stream 58 within a cylindrical or cartesian coordinate system. For example, FIG. 9B is an example three-dimensional plot of powder detections plotted in cartesian coordinates.

Figure 10A:
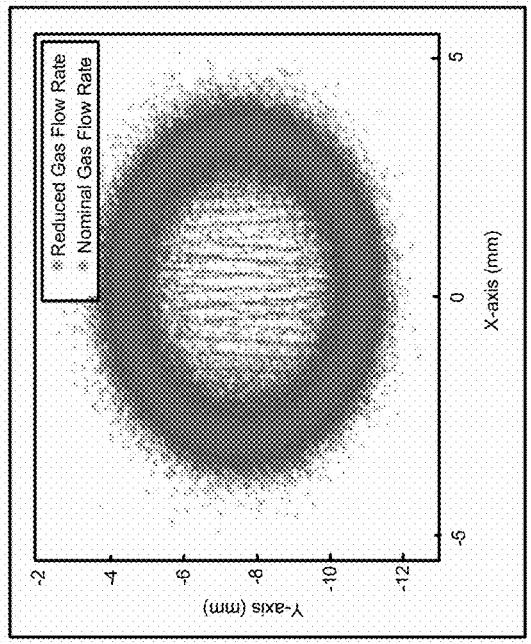
FIG. 10A is an example plot of particle detections in an image plane plotted in polar coordinates for each of two gas flow rates.
Figure 10B:
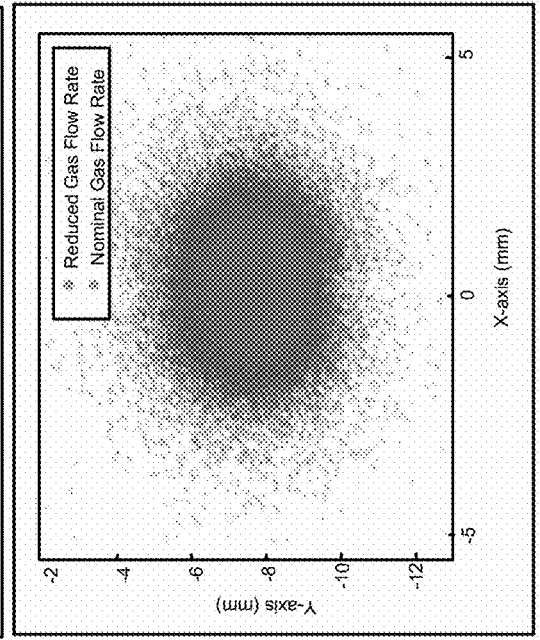
FIG. 10B is an example three-dimensional plot of particle detections plotted in cartesian coordinates.

FIG. 10A is an example plot of particle detections in an image plane plotted in cartesian coordinates. FIG. 10B is an example three-dimensional plot of particle detections plotted in cartesian coordinates. As shown in the comparison of FIGS. 9A and 10A, powder stream 58 may have a different shape in the image plane at different axial locations of powder stream 58. For example, at some axial locations, as shown in FIG. 9A, powder stream 58 may have a substantially annular shape. As another example, at other axial locations, as shown in FIG. 10A, powder stream 58 may have a substantially elliptical or substantially circular shape.

In addition to generally representing a shape of powder stream 58, the techniques of plotting powder detections within a coordinate system also may facilitate analysis of changes to system parameters. For example, FIGS. 9A and 10A each show differences in powder distribution due to changes in carrier gas flow rate (a flow rate of gas entraining the powder and delivering the powder to powder delivery device 52 and out of nozzles 56). As shown in FIGS. 9A and 10A, changing carrier gas flow rates may affect a quality of focus of powder stream 58. FIGS. 9B and 10B illustrate the three-dimensional shape of powder stream 58 for the two different carrier gas flow rates, and similarly show changes in the shape of powder stream 58 due to the differences in carrier gas flow rates.

Although FIGS. 9A-10B show how representing a shape of powder stream 58 based on particle detections can be used to evaluate changes in carrier gas flow rates, representing a shape of powder stream 58 based on particle detections can also be used to analyze effects of other parameters, e.g., stand-off height; powder feed rate; nozzle size, shape, or number; valve position; and/or wear or damage to one or more components of the system (e.g., nozzles 56, or channels or valves within powder delivery device 52). In this way, the techniques described herein may enable an operator or designer to better understand operation of the system and effects of operating parameters on powder stream 58.

Figure 11:
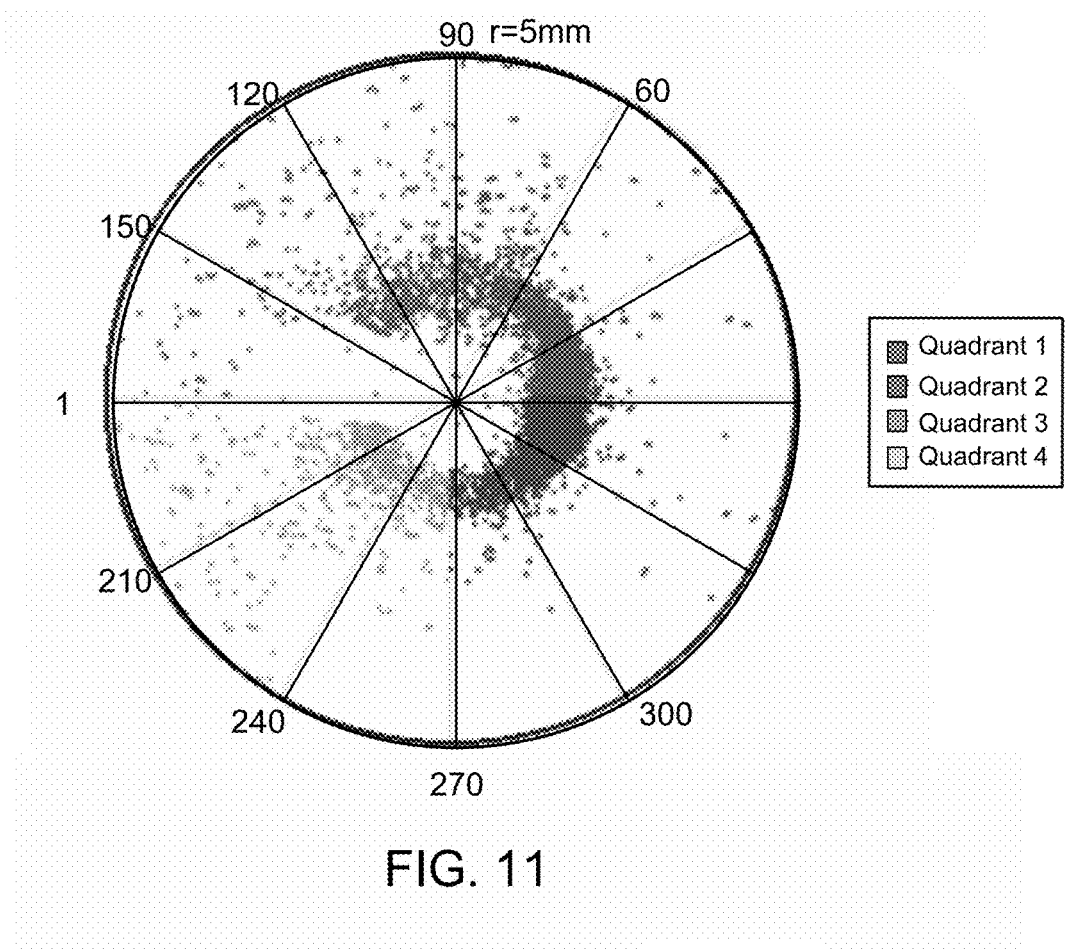
FIG. 11 is an example plot of particle detections in an image plane plotted in polar coordinates.

In some examples, representing a shape of powder stream 58 based on particle detections may be used to detect a clog within the system or damage to a component of the system. For example, FIG. 11 is an example plot of powder detections in an image plane plotted in polar coordinates. The polar coordinates are divided into four quadrants, each quadrant corresponding to a 90 degree sector. Quadrant 1 extends from 0 to 90 degrees, quadrant 2 extends from 90 to 180 degrees, quadrant 3 extends from 180 degrees to 270 degrees, and quadrant 4 extends from 270 degrees to 0 degrees. As shown in FIG. 11, the powder distribution is asymmetric. Near the boundary of quadrants 2 and 3 (between about 145 degrees and 190 degrees), the powder distribution is low, while near the boundary of quadrants 4 and 1 (about 330 to 30 degrees), the powder distribution is high. This may indicate a clog within a nozzle directing powder to between 145 degrees and 190 degrees or may indicate damage to a nozzle directing powder to between about 330 to 30 degrees, or both, such that the resulting powder flow is asymmetric.

Figure 12:
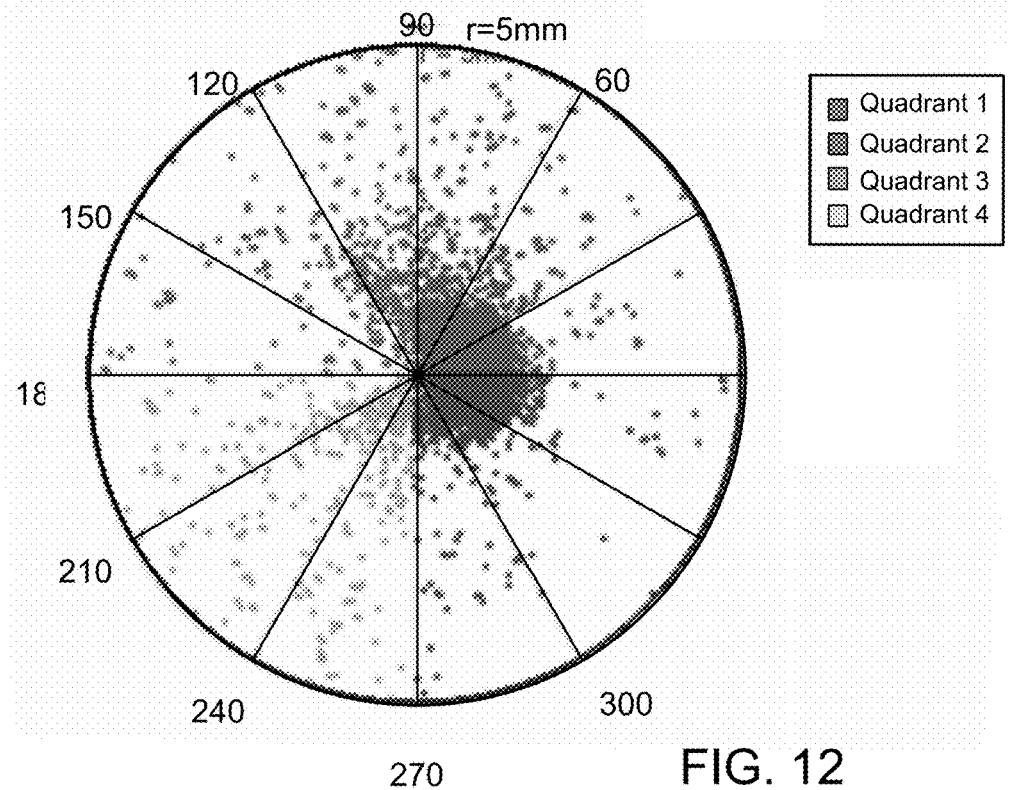
FIG. 12 is an example plot of particle detections in an image plane plotted in polar coordinates.

FIG. 12 is an example plot of particle detections in an image plane plotted in polar coordinates. The data shown in FIG. 12 is from the same powder stream 58 as shown in FIG. 11, but at a different axial position along powder stream 58. FIG. 12 similarly shows a low powder distribution in quadrants 2 and 3 and a high powder distribution in quadrants 1 and 4. Together, FIGS. 11 and 12 may indicate a clog within a nozzle directing powder to between 145 degrees and 190 degrees, or may indicate damage to a nozzle directing powder to between about 330 to 30 degrees, or both, such that the resulting powder flow is asymmetric.

Figure 13:
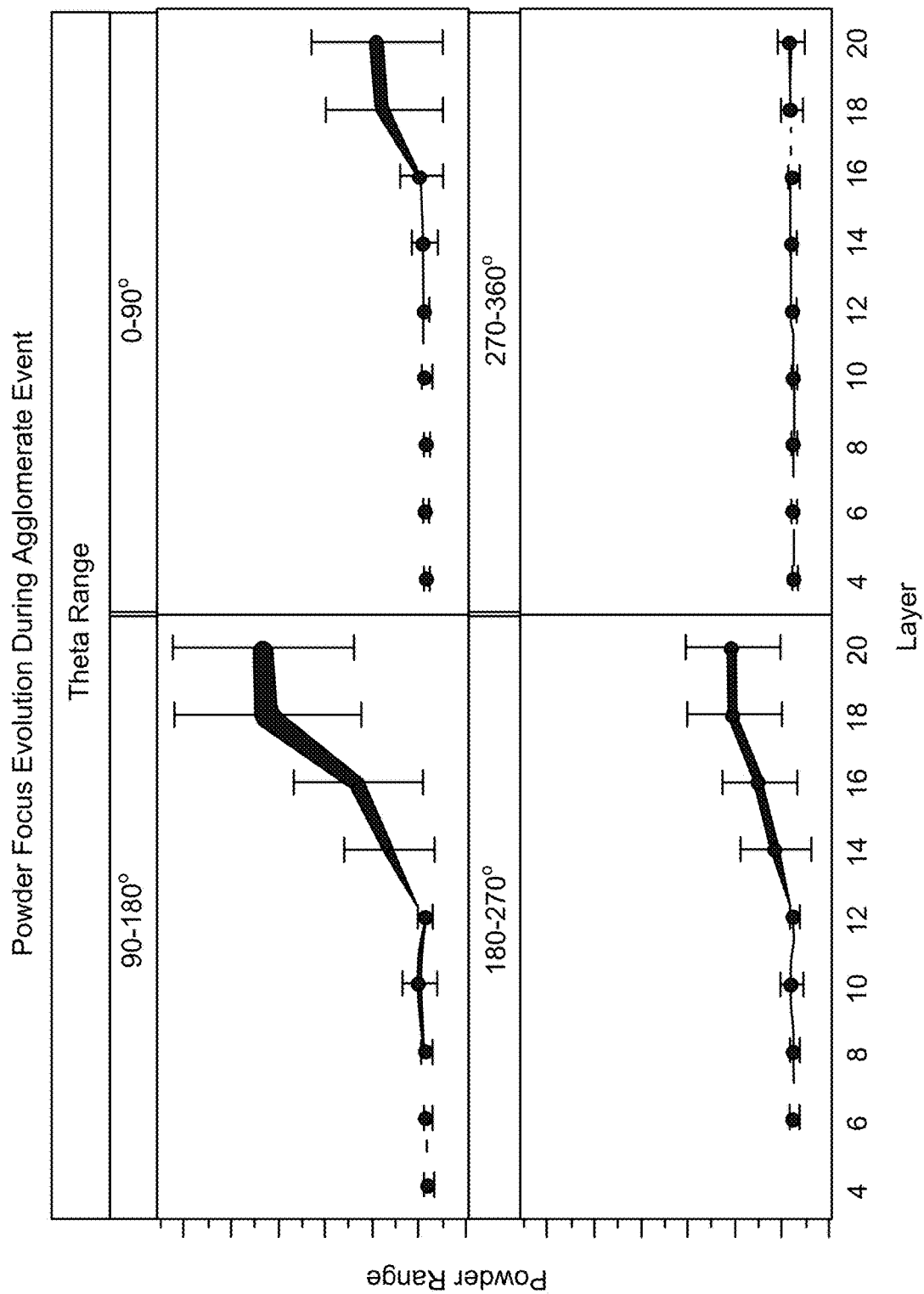
FIG. 13 is an example plot of powder range and standard deviation versus time for each of four image quadrants.

As described above with respect to FIGS. 7A-8B, computing device 12 may be configured to analyze a powder distribution along a radius or within a sector and determine one or more metrics characterizing the powder distribution. In some examples, computing device 12 may determine one or more metrics characterizing the powder distribution as a function of time. FIG. 13 is an example plot of powder range and standard deviation versus time for each of four image sectors (e.g., quadrants). Computing device 12 may select a region of interest (e.g., a quadrant) within the image plane; for each of a plurality of image frames in a sequence of image frames, determine a radial distance within the region of interest at which a mean intensity of the powder locations occurs and determine a standard deviation of the radial distance; and generate a plot illustrating the radial distance and the standard deviation of the radial distance for the region of interest versus time. The results of this analysis are shown in FIG. 13. As shown in FIG. 13, the powder range and standard deviation may change in response to powder agglomeration (e.g., a clog). Similarly, powder range and standard deviation may change in response to nozzle wear or damage. For instance, a clog, agglomeration, or nozzle wear or damage may cause an increase in powder range and standard deviation (as suggested by FIGS. 11 and 12). This may enable computing device 12 or an operator of computing device 12 to detect a clog, agglomeration, or nozzle wear or damage rapidly after the clog, agglomeration, or nozzle wear or damage occurs.

Figure 14C:
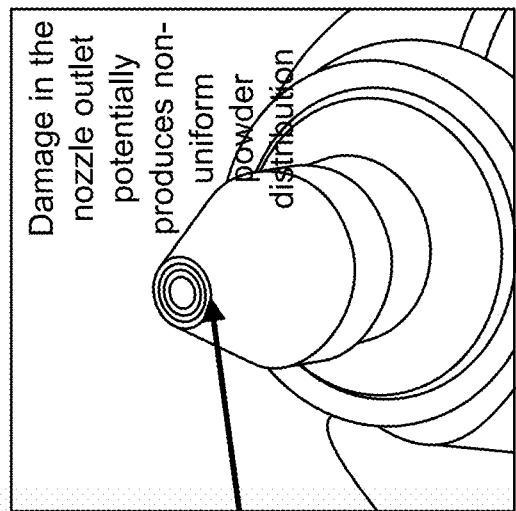
FIG. 14C is an image of the powder nozzle used to form the powder flow represented in FIGS. 14A and 14B, showing damage in the powder nozzle.
Figure 14B:
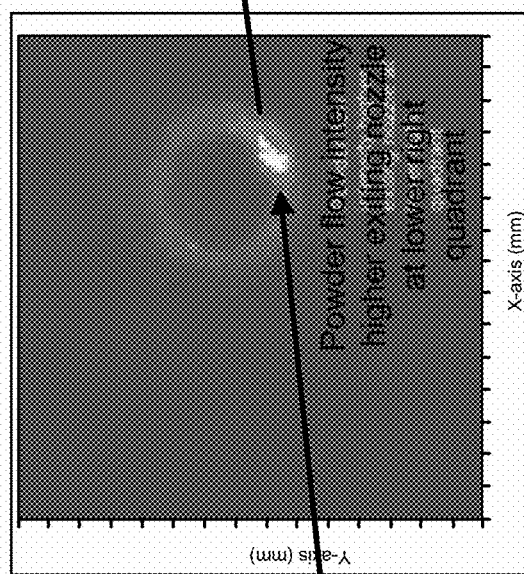
FIGS. 14A and 14B are example heat maps illustrating powder mass flow at different z-axis heights of a powder stream.
Figure 14A:
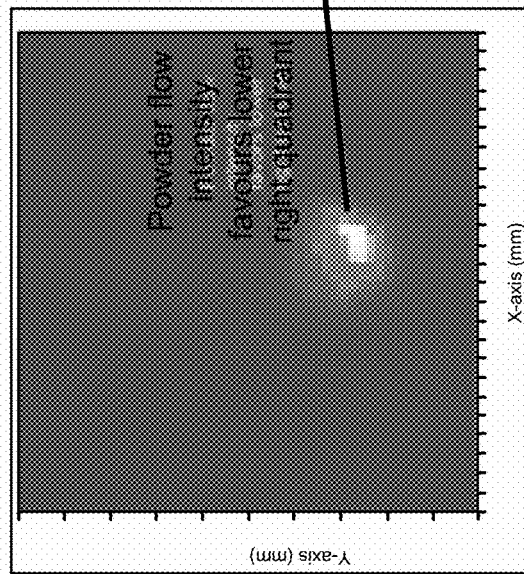

FIGS. 14A-14C illustrate an example of how computing device 12 may detect a damaged nozzle using powder distribution (e.g., a heat map like that shown in FIG. 5). FIGS. 14A and 14B are example heat maps illustrating powder mass flow at different z-axis heights (axial locations) of a powder stream 58. As shown in both FIGS. 14A and 14B, a relatively high powder distribution is concentrated in a lower right quadrant of powder stream 58. FIG. 14C is an image of the powder nozzle used to form the powder flow represented in FIGS. 14A and 14B, showing damage in the powder nozzle in the lower right quadrant. As such, this suggests that heat maps of powder distribution may be used (e.g., by computing device 12) to identify a damaged nozzle.

Figure 15:
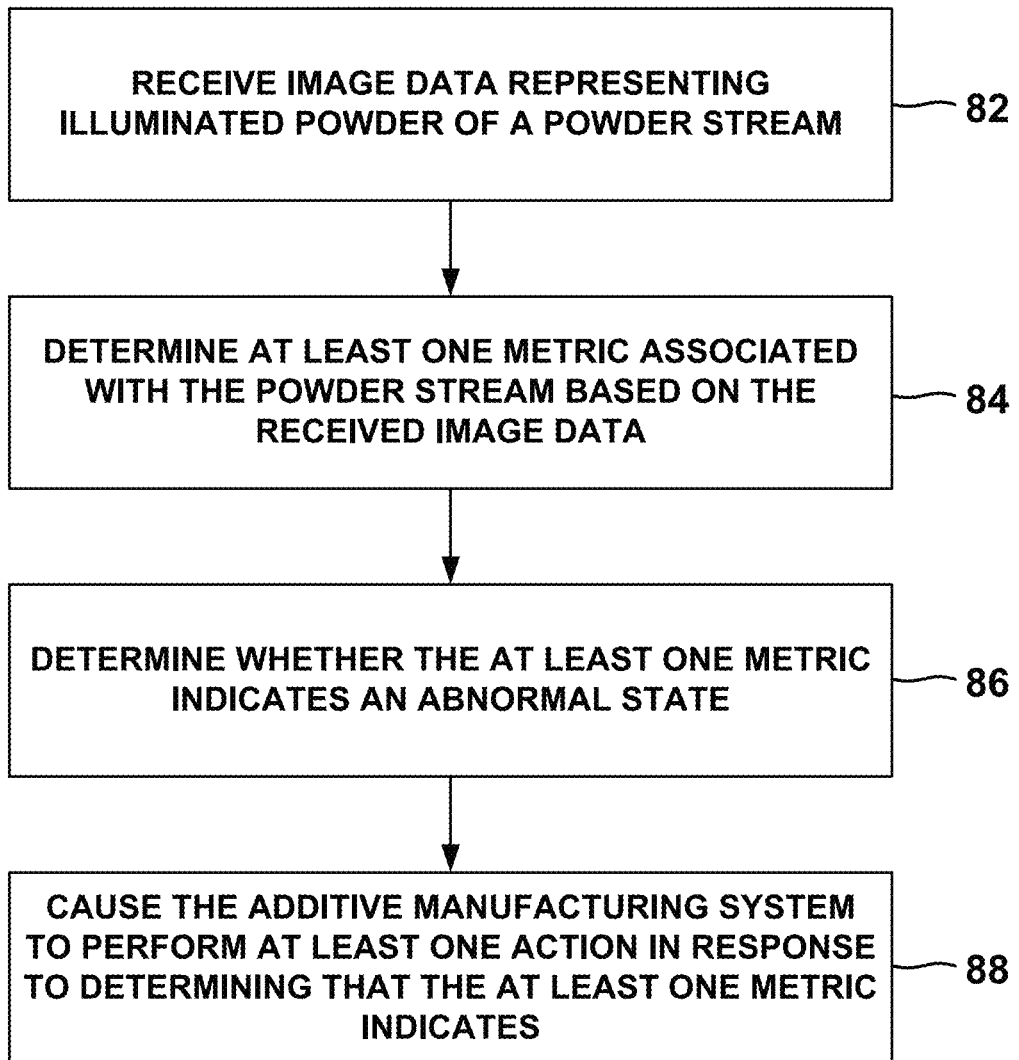
FIG. 15 is a flow diagram illustrating an example technique for controlling an additive manufacturing system based on data collected using a powder flow monitoring system.

In some examples, data regarding powder stream 58 collected using PFMS 50 may be used to control operation of an additive manufacturing system. FIG. 15 is flow diagram illustrating an example technique for controlling an additive manufacturing system based on data regarding powder stream 58 collected using PFMS 50. The flow diagram of FIG. 15 will be described with concurrent reference to system 10 of FIG. 1 and PFMS 50 and powder delivery device 52 of FIG. 2. However, system 10 and PFMS 50 and powder delivery device 52 may be used to perform other techniques, and other systems and devices may be used to perform the technique of FIG. 15.

The technique of FIG. 15 includes receiving, by one or more computing devices 12, image data representing illuminated powder of a powder stream 58 between a powder delivery device 52 of an additive manufacturing system and a build surface of a component (82). As described above, e.g., with reference to FIG. 2, computing device 12 may be configured to receive image data representing an image captured by imaging device 62. The image data may include representations of illuminated powder of powder stream 58, as imaged by imaging device 62 (e.g., as captured in an image frame by imaging device 62). In some examples, computing device 12 may receive image data representative of a sequence of images of illuminated powder in powder stream 58. Each image may be associated with a time.

The technique of FIG. 15 also includes determining, by one or more computing devices 12, at least one metric associated with the powder stream based on the received image data (84). In some examples, the at least one metric includes a mass flow rate or a powder distribution within powder stream 58. The at least one metric may be associated with a single image frame or a series of image frames and may be associated with an entire image frame or a region of interest within an image frame. For instance, as shown in FIG. 5, the at least one metric may include a plurality of metrics: powder detections from one or more image frames within a plurality of regions of interest. As another example, the at least one metric may include one or more corresponding powder distribution parameter within a sector (e.g., quadrant) of a polar coordinate system, as shown in FIGS. 7A-8B, 11, and 12.

The at least one metric may be indicative of one or more property of powder stream 58, including, for example, powder mass flux for powder stream 58, powder mass flux for a region of interest of powder stream 58, wear or damage to one or more powder nozzles 56, powder distribution within powder stream 58, clogging of one or more powder nozzles 56, flow of the carrier gas in which powder is entrained, flow of a purge gas, or the like.

The technique of FIG. 15 further includes determining, by one or more computing devices 12, whether the at least one metric indicates an abnormal state of the at least one metric (86). For instance, one or more computing devices 12 may be configured to compare the at least one metric associated with each region of interest (of a plurality of regions of interest) to the at least one metric associated with each other region of interest. For example, one or more computing devices 12 may be configured to compare a corresponding powder distribution parameter associated with each quadrant to each other corresponding powder distribution parameter. As another example, one or more computing devices 12 may be configured to compare a corresponding powder mass flux associated with each quadrant to each other corresponding powder mass flux.

One or more computing devices 12 may be configured to determine that the at least one metric indicates the abnormal state in response to the comparison showing differences between the metrics above a threshold difference value. For instance, with reference to FIG. 12, one or more computing devices 12 may compare a powder mass flux associated with quadrant 1 to powder mass fluxes associated with quadrants 2, 3, and 4, may compare a powder mass flux associated with quadrant 2 to powder mass fluxes associated with quadrants 3 and 4, and may compare a powder mass flux associated with quadrant 3 to powder mass fluxes associated with quadrant 4, such that each powder mass flux is compared to each other powder mass flux. In the example of FIG. 11, the powder mass fluxes for quadrants 1 and 4 differ from the powder mass fluxes for quadrants 2 and 3, and may differ by more than a threshold difference value. This may indicate an abnormal state. As a counter example, the mass fluxes for each of the quadrants shown in FIG. 8A are substantially similar and may not differ by more than a threshold difference value. This may indicate a normal state.

One or more computing devices 12 alternatively or additionally may be configured to determine whether the at least one metric indicates an abnormal state of the at least one metric (86) by at least comparing the at least one metric to a baseline range of values. For instance, one or more computing devices 12 may be configured to compare a powder mass flux for a plane of powder stream 58 to a set powder mass flux. As another example, one or more computing devices 12 may be configured to compare a powder mass flux for a region of interest (e.g., a sector or quadrant of a plane of powder stream 58) a set or expected powder mass flux for the region of interest. One or more computing devices 12 may be configured to determine that the at least one metric indicates the abnormal state in response to the at least one metric being outside of the baseline range of values (e.g., differs for the set value or expected value or differs for the set value or expected value by greater than a threshold amount).

The technique of FIG. 15 additionally includes causing, by one or more computing devices 12, the additive manufacturing system to perform at least one action in response to the at least one metric indicating the abnormal state (88). In some examples, one or more computing devices 12 may be configured to control at least one operating parameter of the additive manufacturing system in response to the at least one metric indicating the abnormal state (88). The at least one operating parameter may include a powder feed rate, a carrier gas flow rate, a position of powder delivery device 52, a purge gas flow rate, or combinations thereof. The at least one operating parameter may be an overall flow rate through powder delivery device 52, or a flow rate to a selected (e.g., individual) nozzle 56 of powder delivery device 52.

The at least one action may depend on the abnormal state indicated by the at least one metric. For instance, if the at least one metric indicates a powder mass flux that is lower than a set powder mass flux, one or more computing devices 12 may be configured to cause a powder feed rate to nozzles 56 to increase, e.g., by increasing a carrier gas flow rate through a powder source, increasing a powder agitation rate within the powder source to entrain more powder in the carrier gas, or the like. Alternatively, if the at least one metric indicates a powder mass flux that is lower than a set powder mass flux for a single nozzle, one or more computing devices 12 may be configured to cause a powder feed rate to the single nozzle to increase, e.g., by controlling a valve associated with the single nozzle to open further and permit greater powder flow to the single nozzle.

In some implementations, one or more computing devices 12 may be configured to place powder delivery device 52 in a recovery state while controlling the at least one operating parameter of the additive manufacturing system (88). One or more computing devices 12 may cause powder delivery device 52 to place powder delivery device 52 in the recovery state by at least moving powder delivery device 52 to a position away from the deposition location, such that powder delivery device 52 is no longer directing powder and energy to the build surface. At this position, one or more computing devices 12 may control the at least one operating parameter. By positioning powder delivery device 52 at a position away from the deposition location, one or more computing devices 12 may control the at least one operating parameter without affecting deposition of the powder in the melt pool. This may be useful, as changes in operating parameters may propagate through the additive manufacturing system at a relatively low rate. One or more computing devices 12 may cause powder delivery device 52 remain in the recovery state until the at least one operating parameter has stabilized to a substantially constant value.

In some examples, one or more computing devices 12 may iteratively control the at least one operating parameter, e.g., while powder delivery device 52 is in the recovery state. For example, one or more computing devices 12 may change the at least one operating parameter to a new value, wait for the at least one operating parameter has stabilized to a substantially constant value, and determine and analyze the at least one metric to determine whether the at least one metric indicates a normal or abnormal state. In response to determining that the at least one metric again indicates the abnormal state, one or more computing devices 12 may change the at least one operating parameter to a new value, wait for the at least one operating parameter has stabilized to a substantially constant value, and determine and analyze the at least one metric to determine whether the at least one metric indicates a normal or abnormal state. One or more computing devices 12 may continue to iterate until determining that the at least one metric indicates a normal state.

In some examples, one or more computing devices 12 may be configured control the at least one operating parameter of the additive manufacturing system (88) to clean one or more nozzles 56. For instance, one or more computing devices 12 determine that one or more of nozzles 56 is clogged, e.g., as described above with respect to FIGS. 12-14. In response, one or more computing devices 12 may be configured to cause powder delivery device 52 to move against a scrubbing surface to scrub a clog from one or more of nozzles 56. Alternatively, or additionally, one or more computing devices 12 may be configured to cause a relatively high flow rate of gas (e.g., purge gas or carrier gas) through the nozzle identified to be clogged to attempt to force the clog from the nozzle identified to be clogged.

In this way, a PFMS may be used to obtain data based upon which one or more computing devices 12 may control operation of the additive manufacturing system. This may enable more accurate control of the additive manufacturing system and the resulting additively manufactured component.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following clauses and claims.

Clause 1. A powder flow monitoring system comprising: one or more computing devices configured to: receive image data representing illuminated powder of a powder stream between a powder delivery device and a build surface of a component; generate a representation of the powder stream based on the image data; and output the representation of the powder stream for display at a display device.

Clause 2. The powder flow monitoring system of clause 1, further comprising: an illumination device configured to illuminate at least some of the powder stream between the powder delivery device and the build surface of the component; and an imaging device configured to image the illuminated powder at an image plane between the powder delivery device and the build surface of the component to generate the image data.

Clause 3. The powder flow monitoring system of clause 2, wherein the imaging device is configured to capture a sequence of images, wherein the one or more computing devices is further configured to: receive image data representative of the sequence of images; and generate the representation of the powder stream based on the sequence of images.

Clause 4. The powder flow monitoring system of any one of clauses 1 to 3, wherein the one or more computing devices is configured to generate the representation by at least: determining powder locations within the image plane.

Clause 5. The powder flow monitoring system of clause 4, wherein the one or more computing devices is configured to determine powder locations within the image plane with reference to a polar coordinate system.

Clause 6. The powder flow monitoring system of clause 4 or 5, wherein the one or more computing devices is configured to generate the representation by at least: selecting at least one radius within the image plane; and determining a radial distance along the at least one radius at which a mean intensity of the powder locations occurs.

Clause 7. The powder flow monitoring system of clause 4 or 5, wherein the one or more computing devices is configured to generate the representation by at least: selecting a quadrant within the image plane; and determining a radial distance within the quadrant at which a mean intensity of the powder locations occurs.

Clause 8. The powder flow monitoring system of any one of clauses 1 to 7, wherein the one or more computing devices is configured to generate the representation by at least: determining a powder mass flow based on the imaged powder.

Clause 9. The powder flow monitoring system of clause 8, wherein the one or more computing devices is configured to determine a powder mass flow based on the imaged powder using a calibration curve relating powder mass flow to particle detections.

Clause 10. The powder flow monitoring system of any one of clauses 1 to 9, wherein the one or more computing devices is configured to generate the representation by at least: selecting a region of interest within the image plane; summing all detections of powder at the image plane over time; and outputting a heat map of detections as a function of location within the image plane.

Clause 11. The powder flow monitoring system of any one of clauses 1 to 10, wherein the one or more computing devices is configured to generate the representation by at least: selecting a region of interest within the image plane; and generating a plot of detections versus time for the region of interest.

Clause 12. The powder flow monitoring system of any one of clauses 1 to 11, wherein the one or more computing devices is configured to generate the representation by at least: selecting a region of interest within the image plane; determining a radial distance within the region of interest at which a mean intensity of the powder locations occurs; determining a standard deviation of the radial distance; and generating a plot illustrating the radial distance and the standard deviation of the radial distance for the region of interest versus time.

Clause 13. A method comprising: receiving, by one or more computing devices, image data representing illuminated powder of a powder stream between a powder delivery device and a build surface of a component; generating, by the one or more computing devices, a representation of the powder stream based on the imaged powder; and outputting, by the one or more computing devices, the representation of the powder stream for display at a display device.

Clause 14. The method of clause 13, further comprising: illuminating, by an illumination device, at least some of the powder stream between the powder delivery device and the build surface of the component; imaging, by an imaging device, the illuminated powder at an image plane between the powder delivery device and the build surface of the component to generate the image data.

Clause 15. The method of clause 14, wherein: the imaging device is configured to capture a sequence of images; receiving the image data comprises receiving, by the one or more computing devices, image data representative of the sequence of images; and generating the representation of the powder stream comprises generating, by the one or more computing devices, the representation of the powder stream based on the sequence of images.

Clause 16. The method of any one of clauses 13 to 15, wherein generating the representation of the powder stream based on the imaged powder comprises determining, by the one or more computing devices, powder locations within the image plane.

Clause 17. The method of clause 16, wherein the one or more computing devices determines powder locations within the image plane with reference to a polar coordinate system.

Clause 18. The method of clause 16 or 17, wherein generating the representation of the powder stream based on the imaged powder comprises: selecting, by the one or more computing devices, at least one radius within the image plane; and determining, by the one or more computing devices, a radial distance along the at least one radius at which a mean intensity of the powder locations occurs.

Clause 19. The method of clause 16 or 17, wherein generating the representation of the powder stream based on the imaged powder comprises: selecting, by the one or more computing devices, a quadrant within the image plane; and determining, by the one or more computing devices, radial distance within the quadrant at which a mean intensity of the powder locations occurs.

Clause 20. The method of any one of clauses 13 to 19, wherein generating the representation of the powder stream based on the imaged powder comprises: determining, by the one or more computing devices, a powder mass flow based on the imaged powder.

Clause 21. The method of clause 20, determining the powder mass flow comprises using a calibration curve relating powder mass flow to particle detections.

Clause 22. The method of any one of clauses 13 to 21, wherein generating the representation of the powder stream based on the imaged powder comprises selecting, by the one or more computing devices, a region of interest within the image plane; summing, by the one or more computing devices, all detections of powder at the image plane over time; and outputting, by the one or more computing devices, a heat map of detections as a function of location within the image plane.

Clause 23. The method of any one of clauses 13 to 22, wherein generating the representation of the powder stream based on the imaged powder comprises: selecting, by the one or more computing devices, a region of interest within the image plane; and generating, by the one or more computing devices, a plot of powder detections versus time for the region of interest.

Clause 24. The method of any one of clauses 13 to 23, wherein generating the representation of the powder stream based on the imaged powder comprises: selecting, by the one or more computing devices, a region of interest within the image plane; determining, by the one or more computing devices, a radial distance within the region of interest at which a mean intensity of the powder locations occurs; determining, by the one or more computing devices, a standard deviation of the radial distance; and generating, by the one or more computing devices, a plot illustrating the radial distance and the standard deviation of the radial distance for the region of interest versus time.

What is claimed is:

1. A powder flow monitoring system configured to monitor a powder stream during a blown powder additive manufacturing process, wherein the blown powder additive manufacturing process includes adding material via a powder delivery device to a build surface of a component in sequential layers, wherein the blown powder additive manufacturing process forms a final component composed of the sequential layers on the build surface, the powder flow monitoring system comprising:
   an illumination device configured to illuminate at least some of the powder stream between the powder delivery device and the build surface of the component, wherein the powder delivery device defines a longitudinal axis oriented toward the build surface;
   an imaging device configured to image the illuminated powder at an image plane between the powder delivery device and the build surface of the component to generate image data, the imaging device being positioned adjacent to the longitudinal axis; and
   one or more computing devices configured to, during the blown powder additive manufacturing process:
      receive the image data representing the illuminated powder of the powder stream between the powder delivery device and the build surface of the component;
      generate a representation of the powder stream based on the image data; and
      output the representation of the powder stream for display at a display device.

2. The powder flow monitoring system of claim 1, wherein the imaging device is configured to capture a sequence of images, wherein the one or more computing devices is further configured to:
   receive image data representative of the sequence of images; and
   generate the representation of the powder stream based on the sequence of images.

3. The powder flow monitoring system of claim 1, wherein the one or more computing devices is configured to generate the representation by at least:
   determining powder locations within the image plane.

4. The powder flow monitoring system of claim 3, wherein the one or more computing devices is configured to determine powder locations within the image plane with reference to a polar coordinate system.

5. The powder flow monitoring system of claim 3, wherein the one or more computing devices is configured to generate the representation by at least:
   selecting at least one radius within the image plane; and
   determining a radial distance along the at least one radius at which a mean intensity of the powder locations occurs.

6. The powder flow monitoring system of claim 3, wherein the one or more computing devices is configured to generate the representation by at least:
   selecting a quadrant within the image plane; and
   determining a radial distance within the quadrant at which a mean intensity of the powder locations occurs.

7. The powder flow monitoring system of claim 1, wherein the one or more computing devices is configured to generate the representation by at least:
   determining a powder mass flow based on the imaged powder.

8. The powder flow monitoring system of claim 7, wherein the one or more computing devices is configured to determine a powder mass flow based on the imaged powder using a calibration curve relating powder mass flow to particle detections.

9. The powder flow monitoring system of claim 1, wherein the one or more computing devices is configured to generate the representation by at least:
   selecting a region of interest within the image plane;
   summing all detections of powder at the image plane over time; and
   outputting a heat map of detections as a function of location within the image plane.

10. The powder flow monitoring system of claim 1, wherein the one or more computing devices is configured to generate the representation by at least:
    selecting a region of interest within the image plane; and
    generating a plot of detections versus time for the region of interest.

11. The powder flow monitoring system of claim 1, wherein the one or more computing devices is configured to generate the representation by at least:
    selecting a region of interest within the image plane;
    determining a radial distance within the region of interest at which a mean intensity of powder locations occurs;
    determining a standard deviation of the radial distance; and
    generating a plot illustrating the radial distance and the standard deviation of the radial distance for the region of interest versus time.

12. A method comprising:
    additively manufacturing a component via a blown powder additive manufacturing process, wherein the blown powder additive manufacturing process includes adding material via a powder delivery device to a build surface of the component in sequential layers, and wherein the blown powder additive manufacturing process forms a final component composed of the sequential layers on the build surface; and
    monitoring a powder stream during the blown powder additive manufacturing process by at least:
        illuminating, by an illumination device, at least some of the powder stream between the powder delivery device and the build surface of the component;
        imaging, by an imaging device, the illuminated powder at an image plane between the powder delivery device and the build surface of the component to generate image data;
        receiving, by one or more computing devices, the image data representing illuminated powder of the powder stream between the powder delivery device and the build surface of the component;
        generating, by the one or more computing devices, a representation of the powder stream based on the imaged powder; and
        outputting, by the one or more computing devices, the representation of the powder stream for display at a display device.

13. The method of claim 12, wherein:
    the imaging device is configured to capture a sequence of images;
    receiving the image data comprises receiving, by the one or more computing devices, image data representative of the sequence of images; and
    generating the representation of the powder stream comprises generating, by the one or more computing devices, the representation of the powder stream based on the sequence of images.

14. The method of claim 12, wherein generating the representation of the powder stream based on the imaged powder comprises determining, by the one or more computing devices, powder locations within the image plane.

15. The method of claim 14, wherein the one or more computing devices determines powder locations within the image plane with reference to a polar coordinate system.

16. The method of claim 14, wherein generating the representation of the powder stream based on the imaged powder comprises:
    selecting, by the one or more computing devices, at least one radius within the image plane; and
    determining, by the one or more computing devices, a radial distance along the at least one radius at which a mean intensity of the powder locations occurs.

17. The method of claim 14, wherein generating the representation of the powder stream based on the imaged powder comprises:
    selecting, by the one or more computing devices, a quadrant within the image plane; and
    determining, by the one or more computing devices, radial distance within the quadrant at which a mean intensity of the powder locations occurs.

18. The method of claim 12, wherein generating the representation of the powder stream based on the imaged powder comprises:
    determining, by the one or more computing devices, a powder mass flow based on the imaged powder.

19. The method of claim 12, wherein monitoring the powder stream during the blown powder additive manufacturing process further includes outputting, by the one or more computing devices, a control signal to control the blown powder additive manufacturing process based on the representation of the powder stream.

20. An additive manufacturing system, comprising:
    a powder delivery device configured to direct a powder stream toward a build surface of a component during a blown powder additive manufacturing process, wherein the powder delivery device defines a longitudinal axis oriented toward the build surface, and wherein the blown powder additive manufacturing process forms a final component composed of sequential layers on the build surface; and
    a powder flow monitoring system configured to monitor the powder stream during the blown powder additive manufacturing process, the powder flow monitoring system comprising:
        an illumination device configured to illuminate at least some of the powder stream between the powder delivery device and the build surface of the component, wherein the powder delivery device defines a longitudinal axis oriented toward the build surface;
        an imaging device configured to image the illuminated powder at an image plane between the powder delivery device and the build surface of the component to generate image data, the imaging device being positioned adjacent to the longitudinal axis; and one or more computing devices configured to, during the blown powder additive manufacturing process:
  receive the image data representing the illuminated powder of the powder stream between the powder delivery device and the build surface of the component;
  generate a representation of the powder stream based on the image data; and
  output the representation of the powder stream for display at a display device.

\* \* \* \* \*